Jan. 4, 1944.　　　　L. S. HARRISON　　　　2,338,180
ATTENDANCE RECORDER
Filed June 4, 1941　　　　23 Sheets-Sheet 1

INVENTOR
Lawrence S. Harrison
BY
W. M. Wilson
ATTORNEY

Jan. 4, 1944.   L. S. HARRISON   2,338,180
ATTENDANCE RECORDER
Filed June 4, 1941   23 Sheets-Sheet 3

Jan. 4, 1944.  L. S. HARRISON  2,338,180
ATTENDANCE RECORDER
Filed June 4, 1941  23 Sheets-Sheet 6

INVENTOR
Lawrence S. Harrison
BY
ATTORNEY

Jan. 4, 1944. L. S. HARRISON 2,338,180
ATTENDANCE RECORDER
Filed June 4, 1941 23 Sheets-Sheet 7

INVENTOR
Lawrence S. Harrison
BY
ATTORNEY

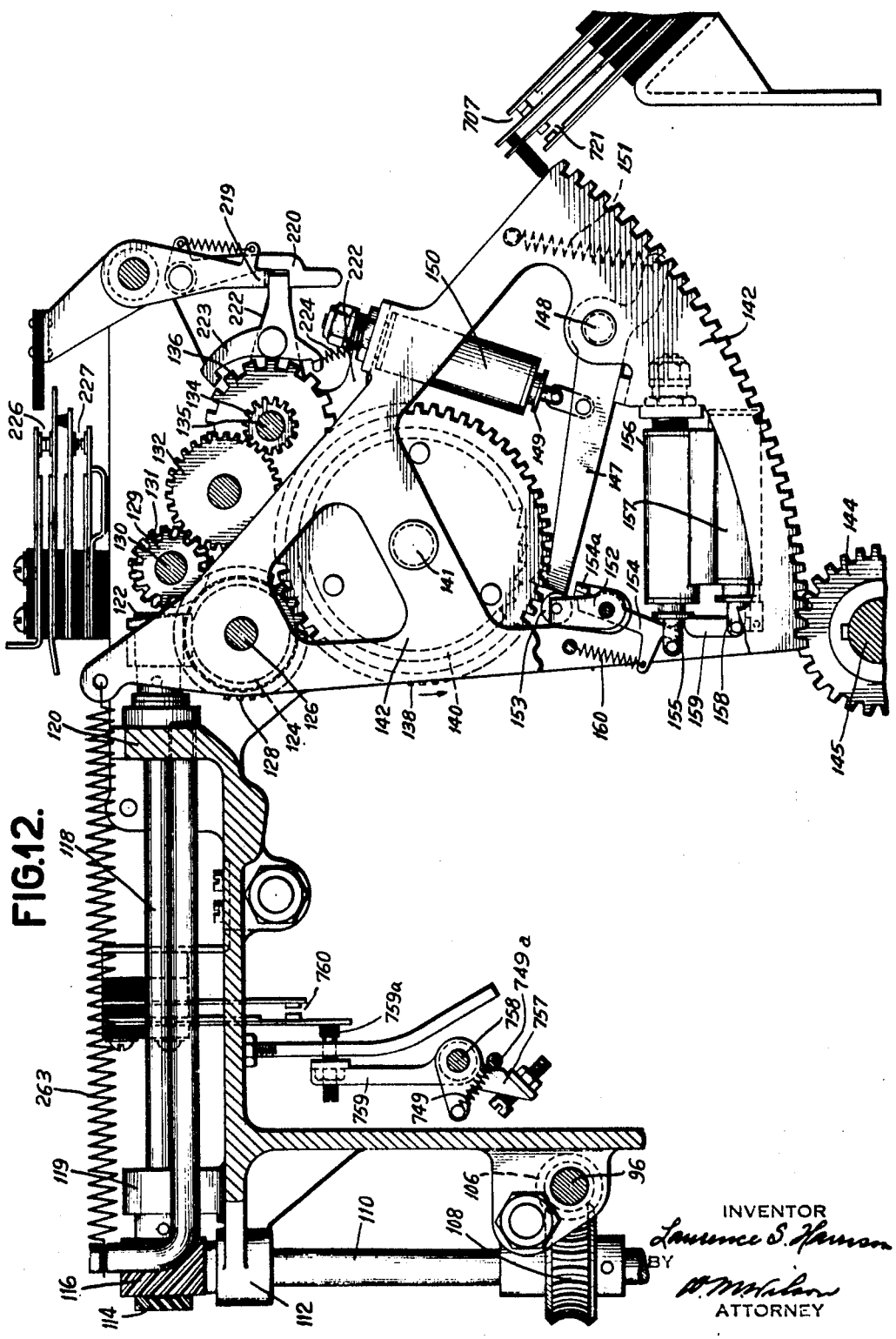

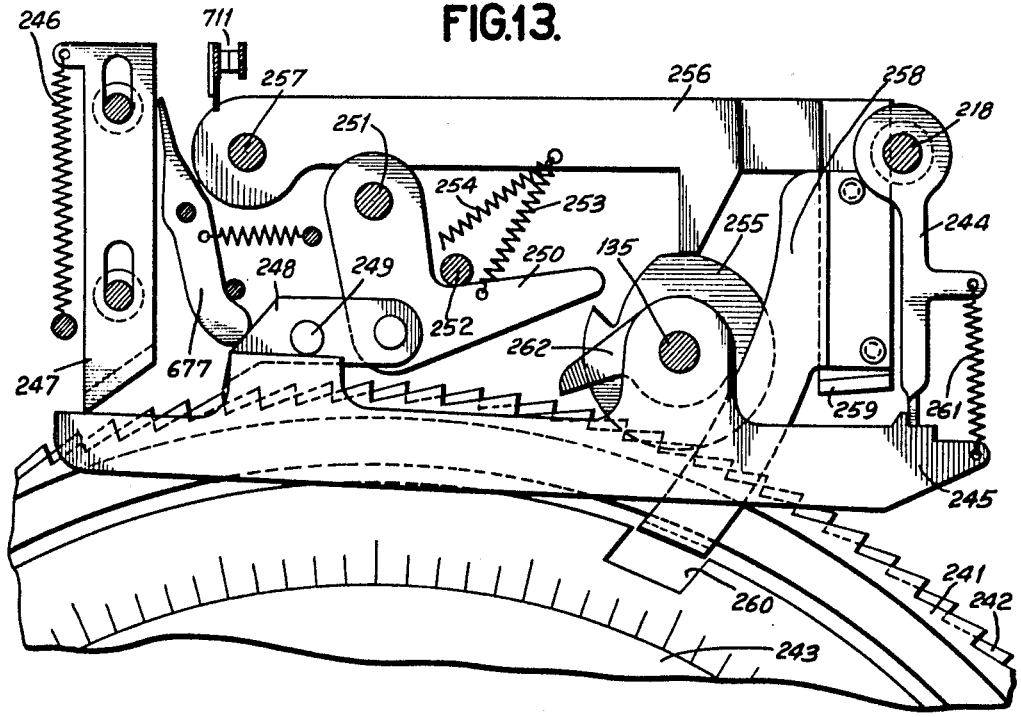
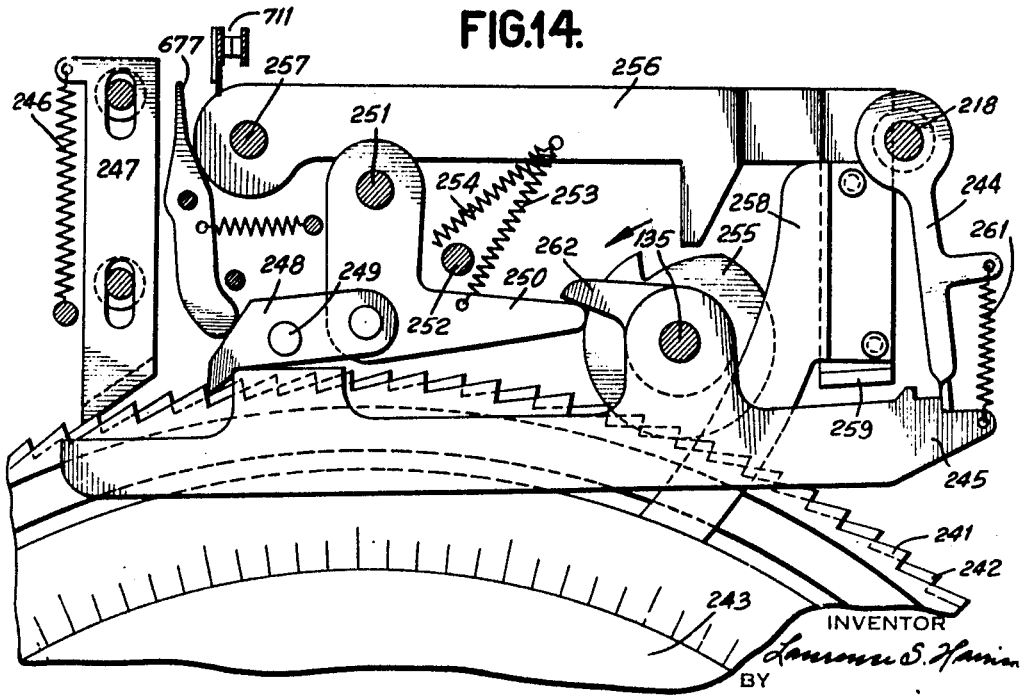

Jan. 4, 1944. L. S. HARRISON 2,338,180
ATTENDANCE RECORDER
Filed June 4, 1941 23 Sheets-Sheet 11
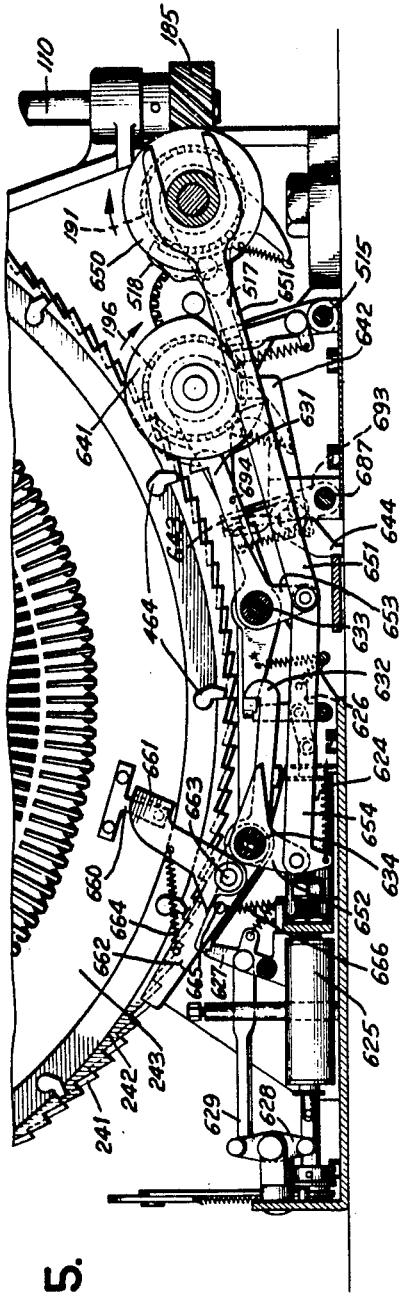
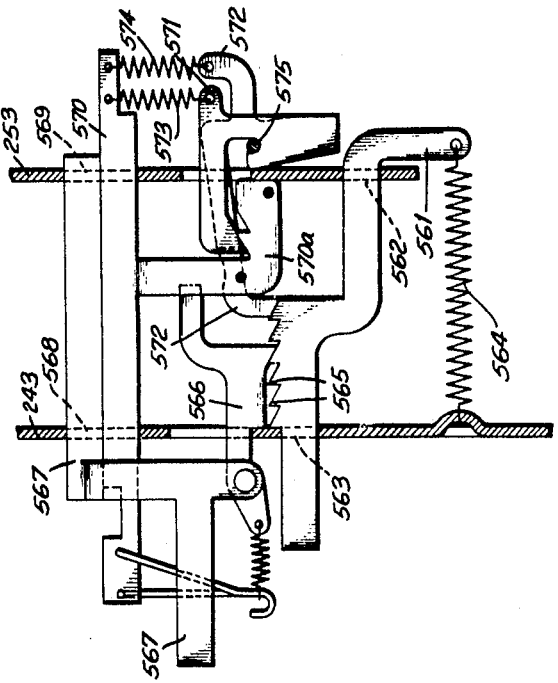
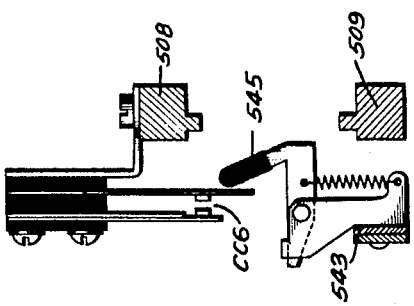
INVENTOR
Laurence S. Harrison
BY
ATTORNEY

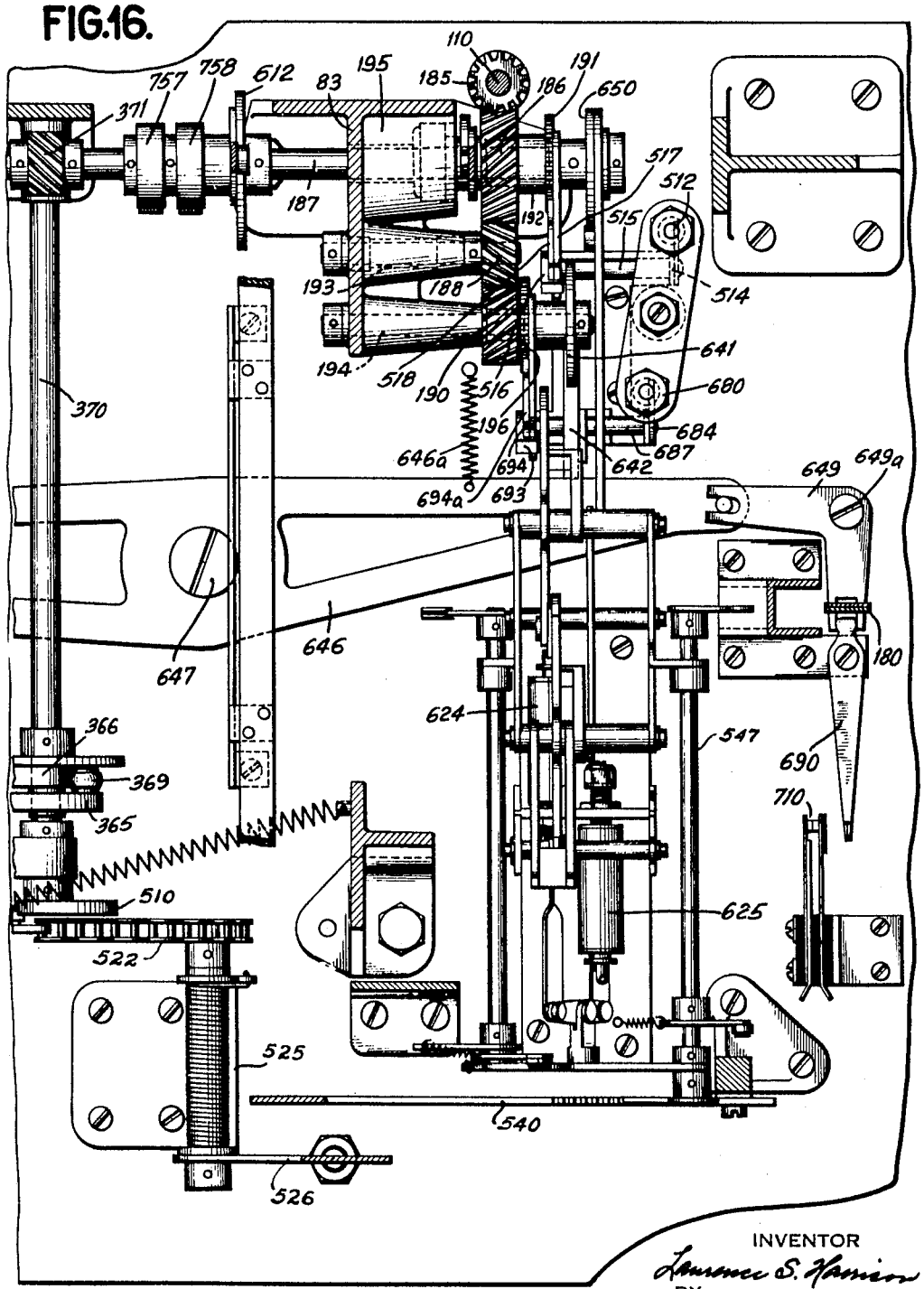

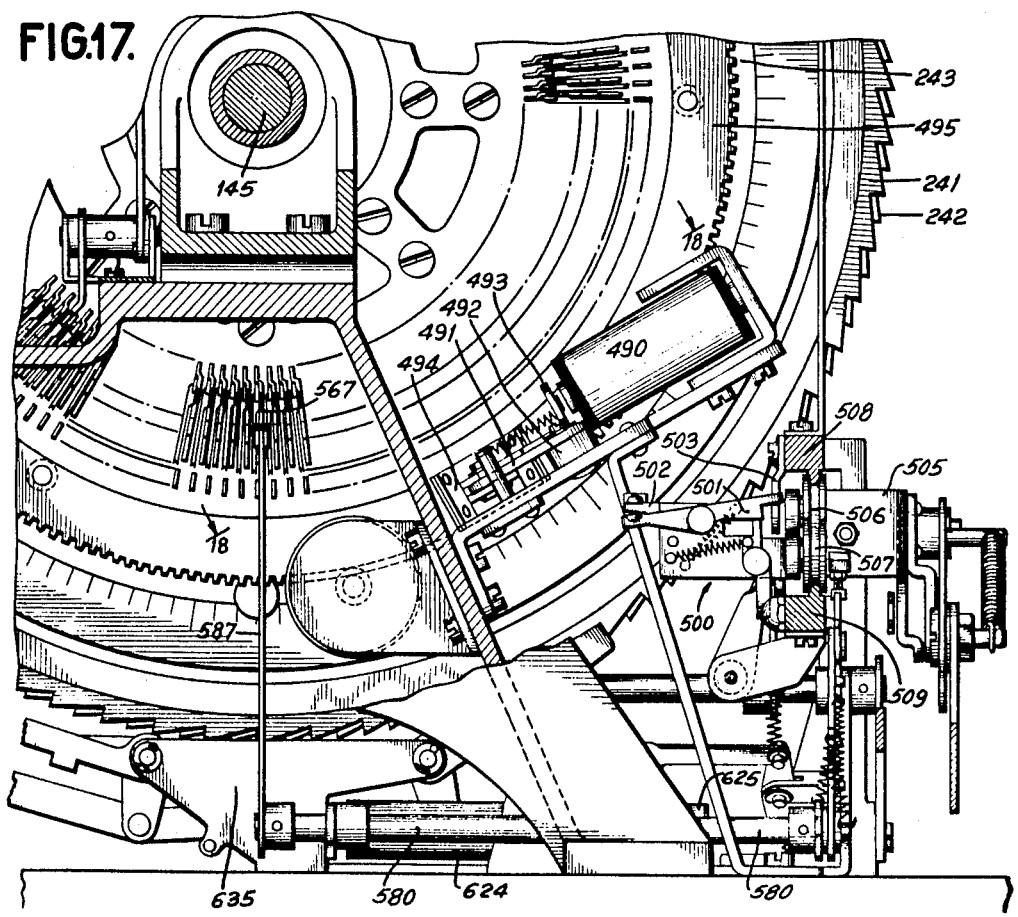
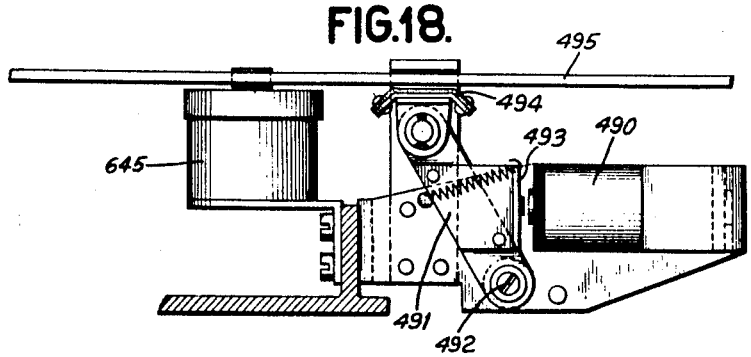

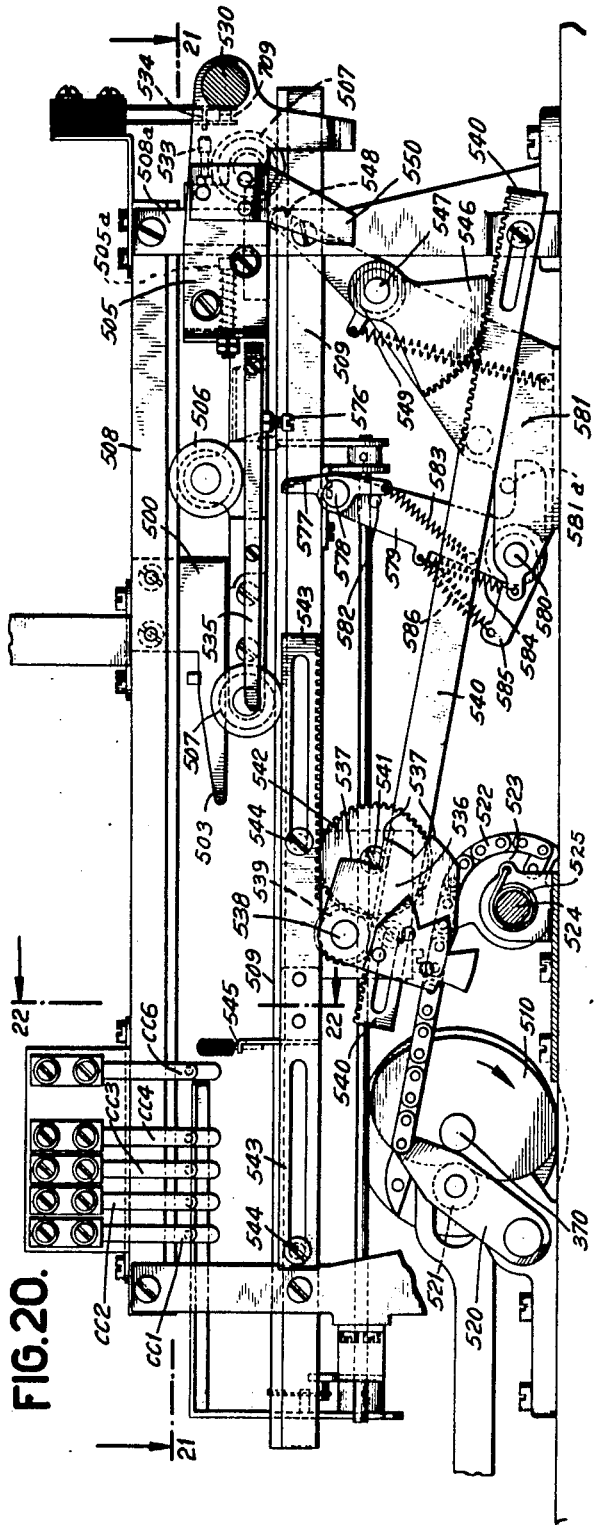

Jan. 4, 1944. L. S. HARRISON 2,338,180
ATTENDANCE RECORDER
Filed June 4, 1941 23 Sheets-Sheet 15

INVENTOR
Lawrence S. Harrison
BY
ATTORNEY

Jan. 4, 1944.   L. S. HARRISON   2,338,180
ATTENDANCE RECORDER
Filed June 4, 1941   23 Sheets-Sheet 16

INVENTOR
Lawrence S. Harrison
BY
ATTORNEY

Jan. 4, 1944.　　　　L. S. HARRISON　　　　2,338,180
ATTENDANCE RECORDER
Filed June 4, 1941　　　　23 Sheets-Sheet 17

INVENTOR
BY
ATTORNEY

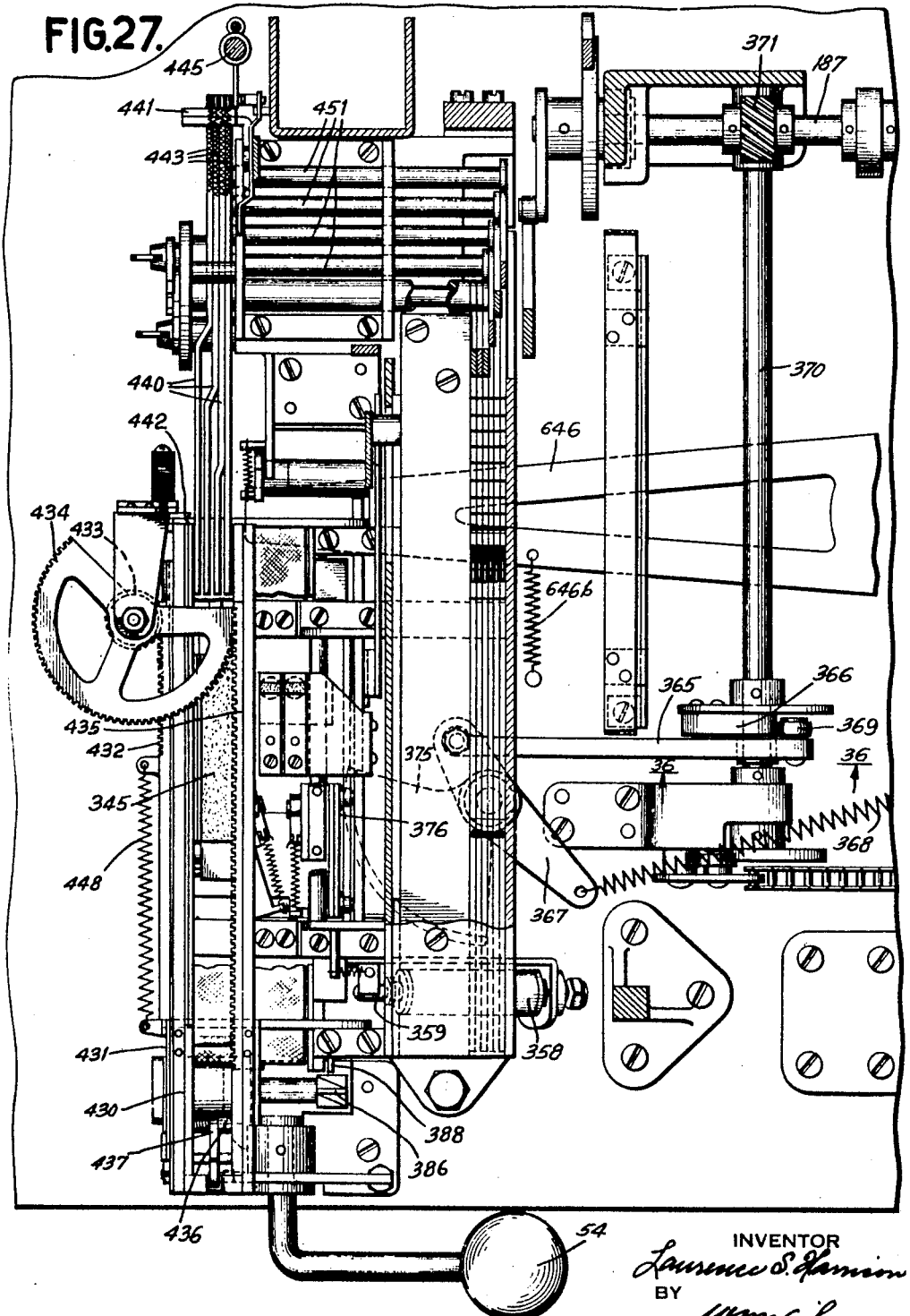

Jan. 4, 1944. L. S. HARRISON 2,338,180
ATTENDANCE RECORDER
Filed June 4, 1941 23 Sheets-Sheet 19
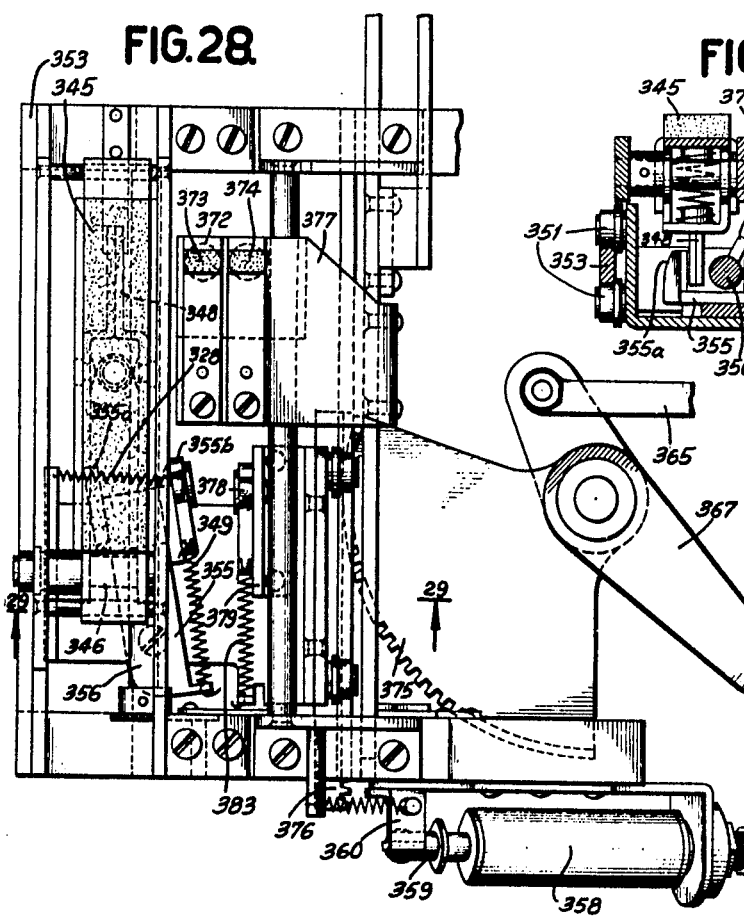
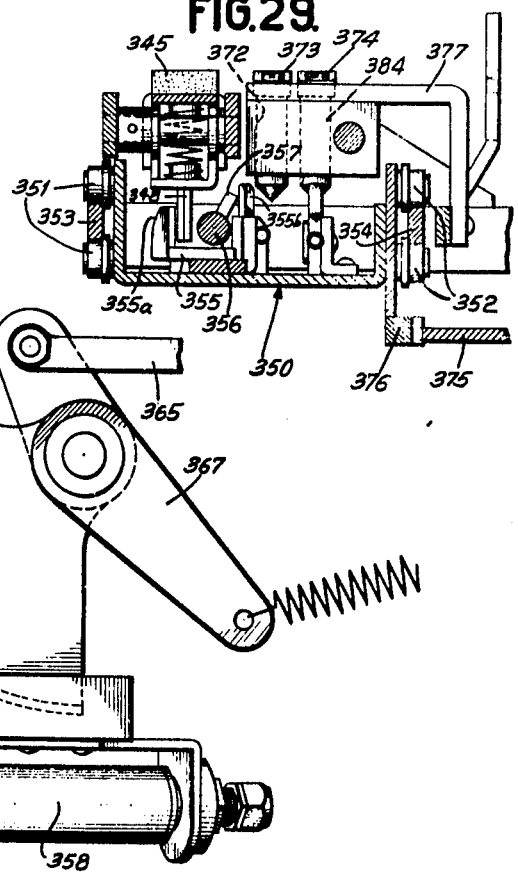
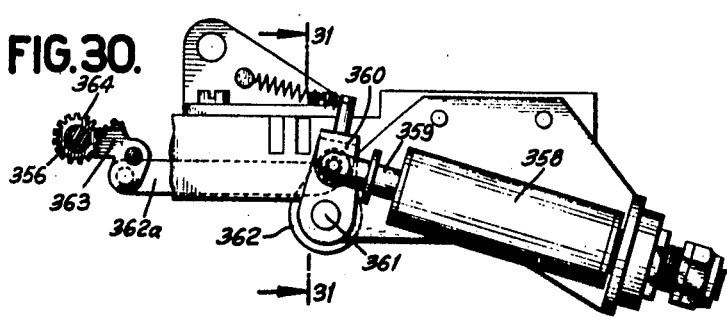
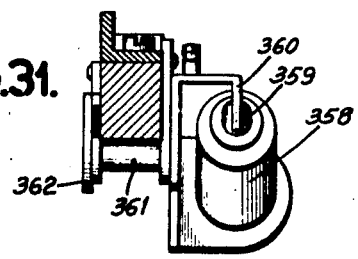
INVENTOR
Lawrence S. Harrison
BY
H. M. Malson
ATTORNEY

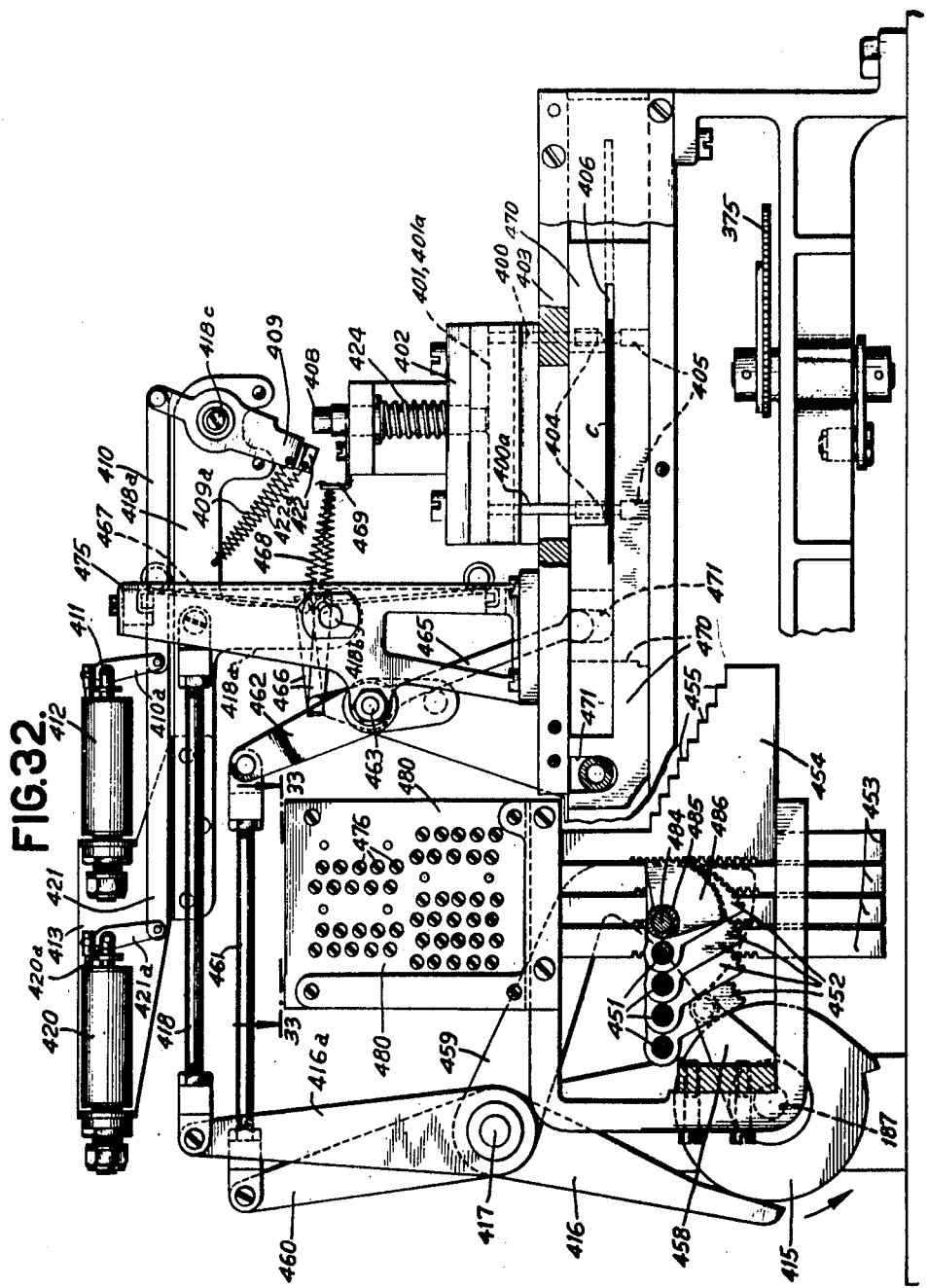

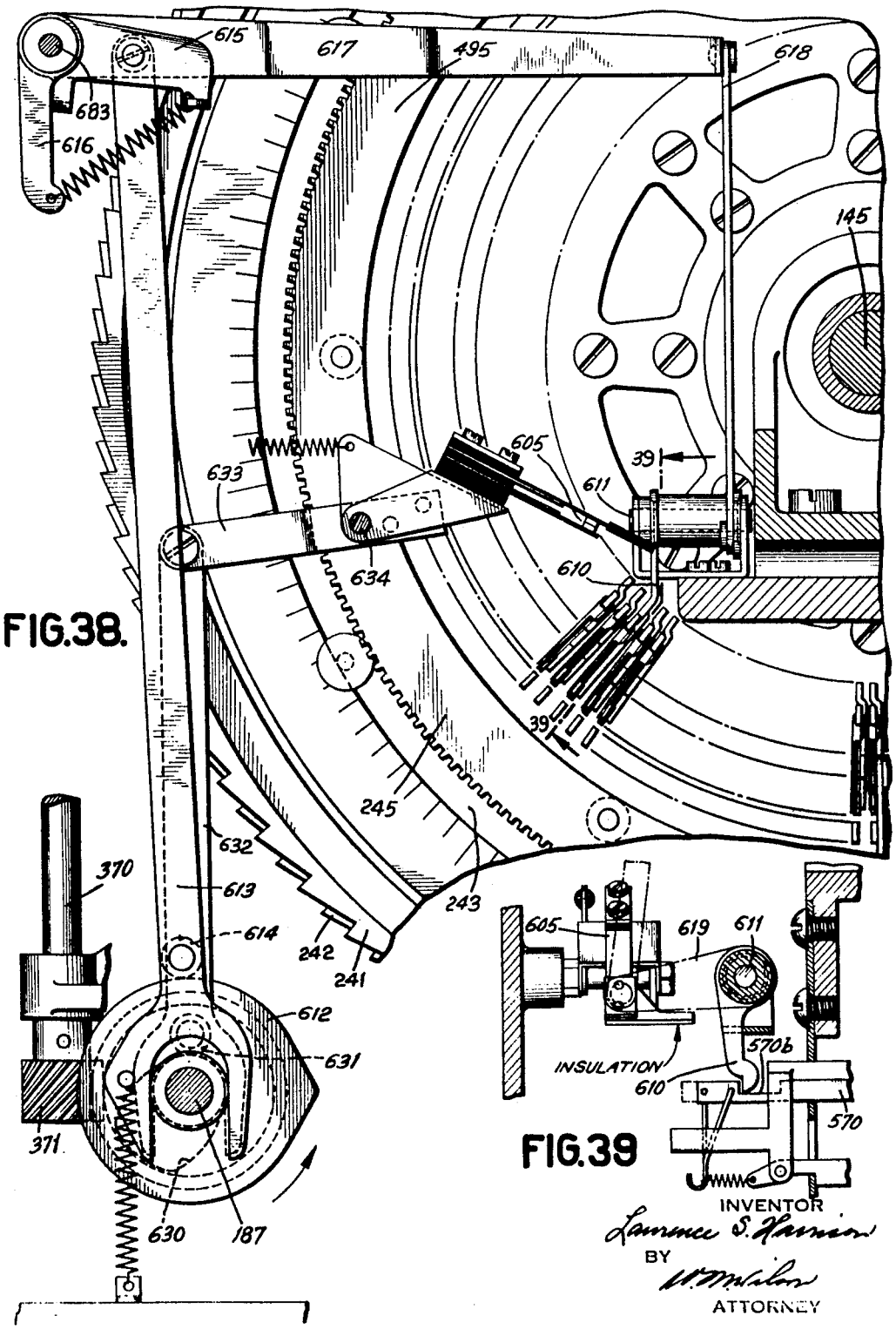

Jan. 4, 1944.  L. S. HARRISON  2,338,180
ATTENDANCE RECORDER
Filed June 4, 1941  23 Sheets-Sheet 22
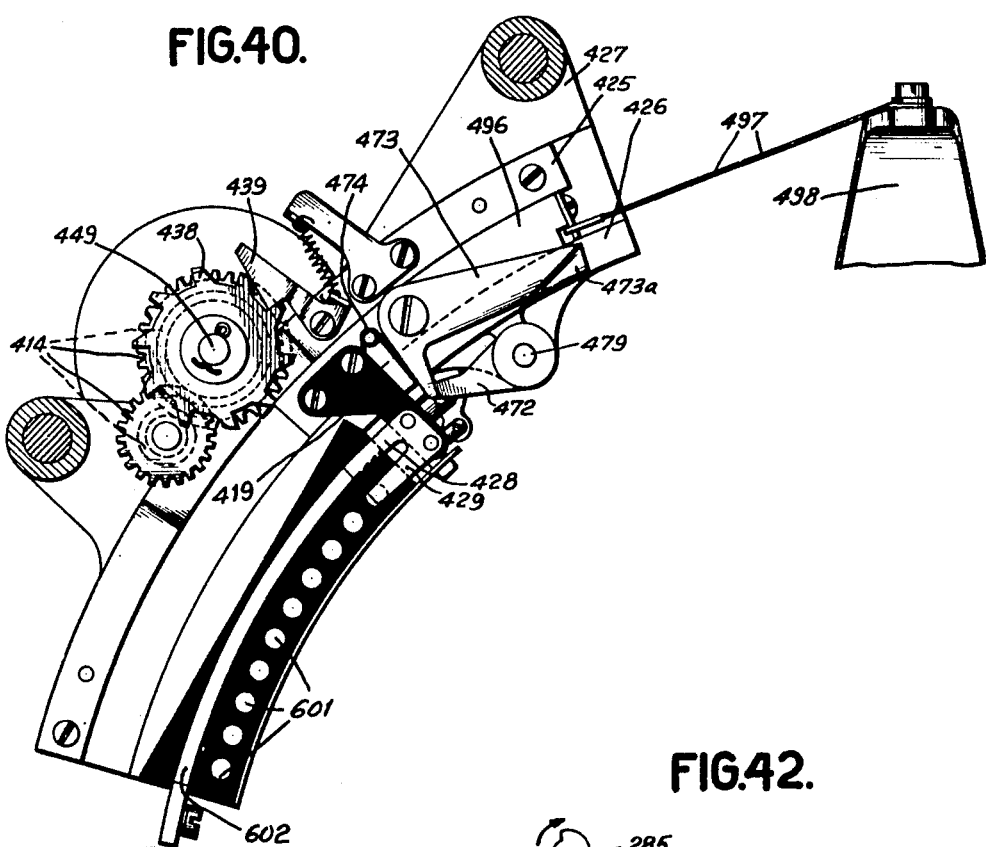
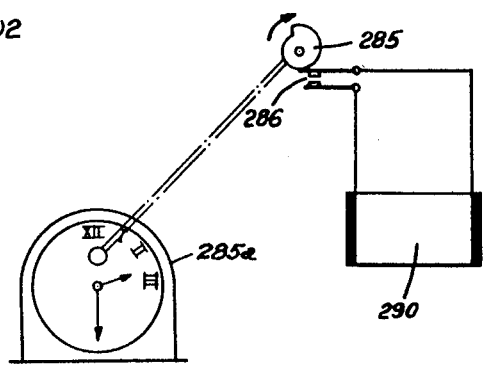
INVENTOR
Lawrence S. Harrison
BY
ATTORNEY

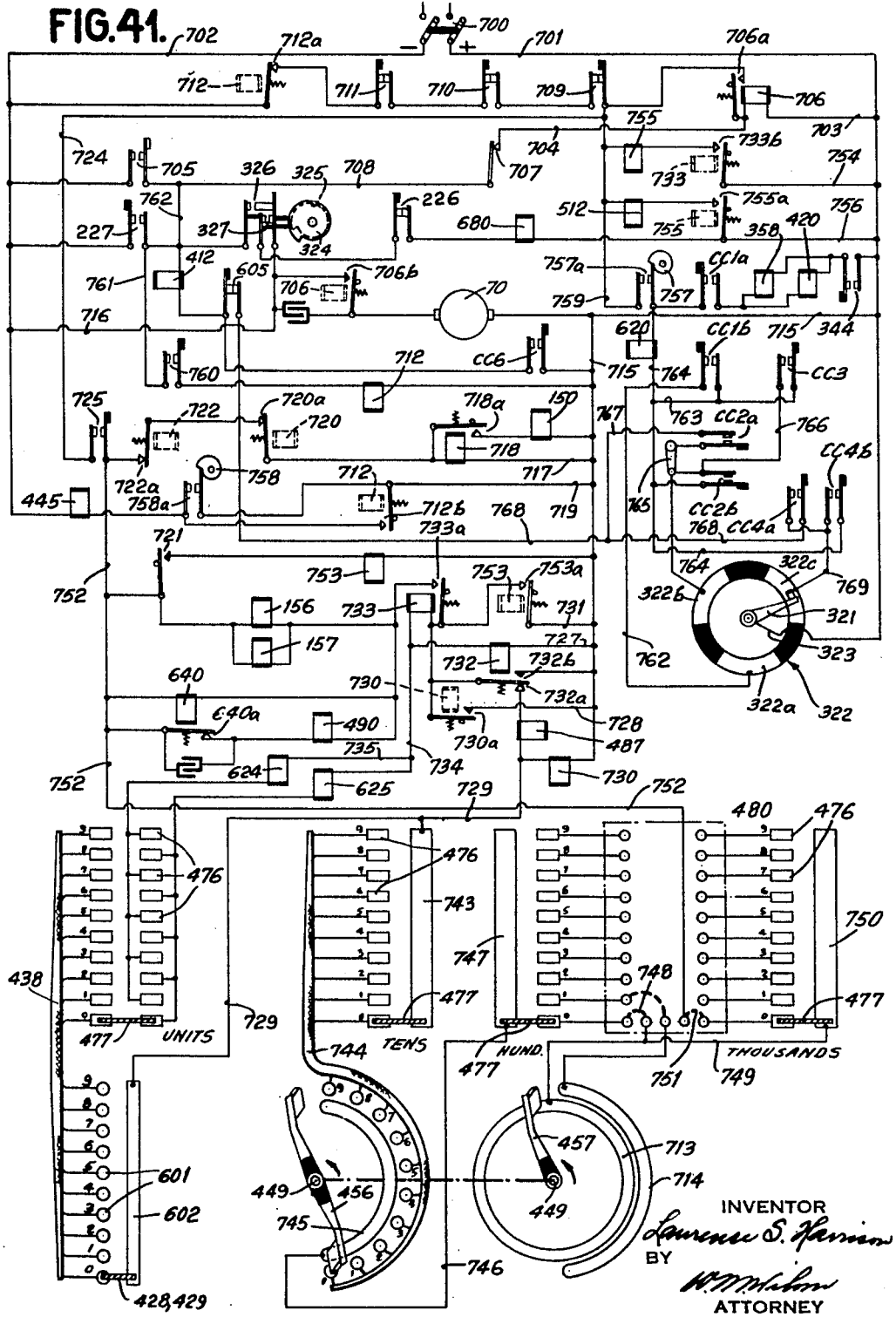

Patented Jan. 4, 1944

2,338,180

UNITED STATES PATENT OFFICE 2,338,180

ATTENDANCE RECORDER

Laurence S. Harrison, Bronxville, N. Y., assignor to International Business Machines Corporation, New York, N. Y., a corporation of New York Application June 4, 1941, Serial No. 396,553

13 Claims. (Cl. 234—43)

This invention relates to time recorders and, more particularly, to attendance recorders which make time records on individual record cards of the arrivals and departures of a designated group of employees.

A general object of the instant invention is to provide an improved attendance recorder in which all operations, even including the handling of the record cards for movement to and from recording positions, are performed automatically, the employee being required merely to insert a token to set the machine in operation to initiate a recording cycle.

Another general object of the invention resides in the provision of punching means for perforating the time card with holes in predetermined locations to represent pertinent information in connection with the regularity of the time recordings, thereby rendering said card suitable for immediate use in certain types of perforated record-controlled accounting machines.

More specifically, an object is to provide an automatic auditing means which causes a perforation to be placed in a particular location in the card if registrations are regular for a predetermined time period, and which fails to perforate those cards on which irregular registrations appear.

Another object is the provision of printing means operating on the record card simultaneously with the punching means to print and punch pertinent time recording data under token control.

A further object is to provide a card rack in which record cards are automatically placed at the beginning of a predetermined time period and from which cards are automatically ejected at the end of that period.

It is also within the contemplation of the invention to provide means for selecting a card from its normal location in the card rack, move it to a predetermined recording position, withdraw it from the latter position after recording has been effected, and replace it once again in its normal location in the rack.

An additional object resides in the provision of automatic locating mechanism, related to each record card, to prevent a second recording on the card from occurring in the same location on that card as the first recording, regardless of the interval of time between such recordings, Another object is the provision of token controlled means in a time recording machine for selecting a record card from a card file and bringing it to a recording position to receive a time recording and also to receive a recording of the information carried by the control token.

A further object is to provide means for suppressing the printing and punching of data carried by the token on all but the initial insertion of a record card into recording position.

According to the invention, it is proposed to provide an attendance recorder which will operate under the control of a token in the possession of each employee. Each token carries type characters denoting the employee's name and man number. The insertion of a token causes a drive motor to become energized to rotate a cylindrical card rack away from its home position. The rack is stopped automatically at a point which corresponds to the man number and a card is fed from the rack to a recording station. At the latter station, the card is subjected to the action of printing and punching elements to print the employee's name and number on the card together with the date and the time, and to punch the employee's number in the card together with other pertinent fixed data such, for example, as the number of the department in which the machine is employed. The card feeding means is arranged to grip the card firmly so that on the return stroke the card is fed back into its original position in the card rack, which then returns to its home position. Meanwhile, the token is released and moves forward to a position where it may be quickly removed by the employee. An individual locating means associated with each pocket of the card rack is operated each time a card is fed from the related pocket. Accordingly, upon the next insertion of a token by the same employee, the card feeding means is controlled so as to feed the employee's card into a different alignment with the recording elements. The arrangement is such that the original information placed on the card is not needlessly duplicated, the second insertion merely causing the time to be printed on the card. In the event that the employee's time recordings made during the day are regular with respect to the prescribed working schedule, a special punch is rendered effective simultaneously with the "night out" recording to perforate the card and thereby designate a full working day credit. A special switch may be thrown to effect a half day working credit perforation simultaneously with the "noon out" recording on Saturday, for example. Should the employee work his full day and then overtime, his card will show a perforation for full day credit and also another perforation for overtime credit, the latter perforation being effected automatically when the employee records his final quitting time for the day. If the employee fails to work his full day, but comes back and puts in overtime, his card receives merely an overtime credit perforation.

In addition to the features mentioned above, it is proposed to provide automatic means for ejecting the cards from the rack at the end of the prescribed payroll period, say at the end of the week for example. New cards are fed one at a time from a card hopper to the pockets of the card rack while the used cards are being ejected. As soon as the card rack is entirely filled with fresh cards, the card feeding operations just described are halted automatically.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an outside view of the machine in perspective with the cover on.

Fig. 9 is a partial rear elevation view showing the essential parts of the drive mechanism, the view being taken on line 9—9 of Fig. 1.

Fig. 12 is a section taken at 12—12 of Fig. 8.

Fig. 13 is a detail sectional view along line 13—13 of Fig. 7 showing the card rack spacing mechanism in its latched position.

Fig. 14 shows the mechanism of Fig. 13 in a tripped position.

Fig. 15 is a detail view of a portion of the drive and of the card rack latching mechanism located at the lower right side of the machine.

Fig. 16 is a sectional view taken at 16—16 of Fig. 7.

Fig. 17 is a section along line 17—17 of Fig. 7.

Fig. 18 is a detail sectional view taken at 18—18 of Fig. 17, setting forth the card rack braking mechanism.

Fig. 19 is a partial vertical section through the location selector wheel showing one of the individual card locating units in detail.

Fig. 20 is a front elevation detail view of the card feed mechanism which feeds the card from the rack to the recording station.

Fig. 21 is a plan view of the mechanism shown in Fig. 20.

Fig. 22 is a detail of a control contact and its operating arm, the arm being carried by the carriage of the card feed mechanism shown in Fig. 20.

Fig. 27 is a sectional view taken at 27—27 of Fig. 7, showing the type wheel carriage support and the associated mechanism.

Fig. 28 is a partial section taken approximately at 28—28 of Fig. 7, setting forth the operating mechanism for the printing platens in detail.

Fig. 29 is a detail sectional view taken at 29—29 of Fig. 28.

Fig. 30 is a front detail view of the print control solenoid shown in Fig. 28 with its connected mechanism.

Fig. 31 is a section taken at 31—31 of Fig. 30.

Fig. 32 is a sectional view taken approximately at 32—32 of Fig. 8, showing a portion of the token controlled slides and punch elements together with the punch operating means.

Fig. 38 is a partial section taken approximately at 38—38 of Fig. 8 with the card rack and side frame omitted to make the operating parts appear more clearly. The mechanism shown here determines whether or not credit perforations are to be punched in the record card.

Fig. 39 is a detail sectional view taken along line 39—39 of Fig. 38.

Fig. 40 is a partial section taken at approximately 40—40 of Fig. 8, showing the circuit controller and associated mechanism for determining the stopping position of the card rack.

Fig. 41 is a wiring diagram of the machine.

Fig. 42 illustrates the special minute impulse circuit for energizing the type wheel setting magnet.

Figure 1:
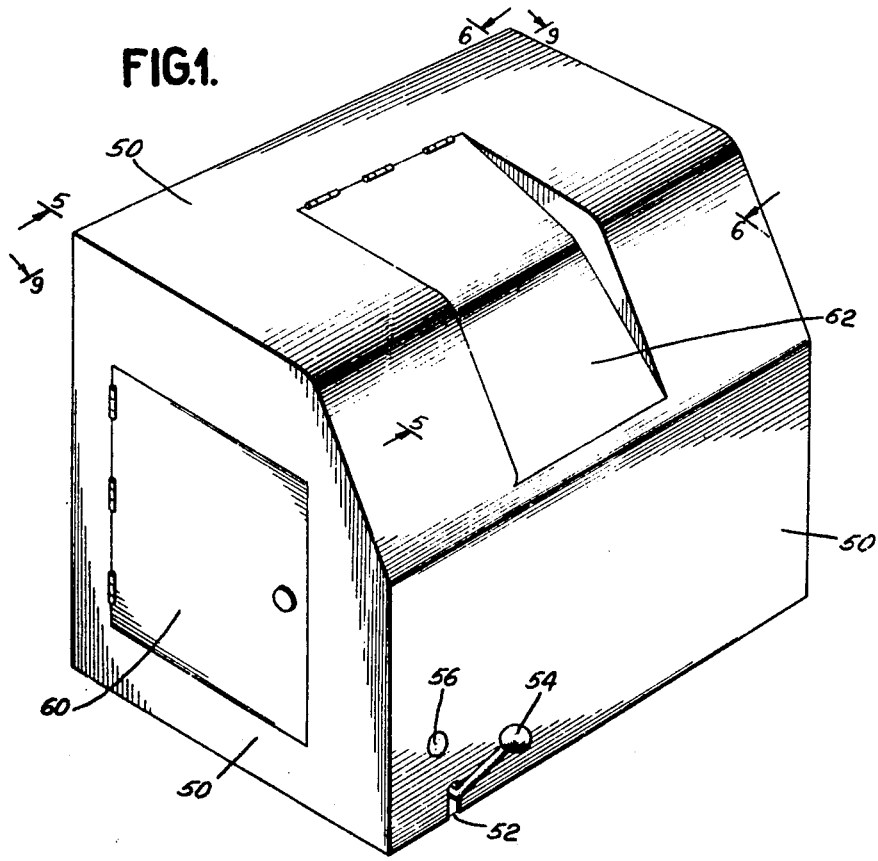
Figure 2:
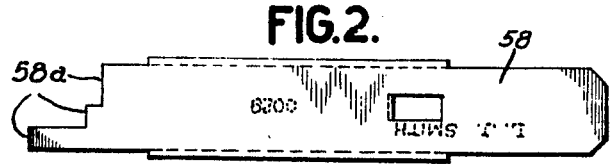
Fig. 2 is a plan view of one of the operating tokens.
Figure 3:
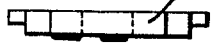
Fig. 3 is an end view of the token shown in Fig. 2.

Referring now to the drawings, the general appearance of the machine is disclosed in Fig. 1. An enclosing cover 50 is provided with a slot 52 at the front of the machine through which an operating handle 54 extends. A hole 56, just above and slightly to the left of the operating handle, permits the insertion of a control token 58 shown in Figs. 2 and 3. Doors 60 and 62 are hinged to the cover and are readily opened to provide easy access to the machine for setting up the desired program and for replenishing the card supply, respectively.

*Drive mechanism*

The driving power for the machine is supplied by an electrical motor 70 (Fig. 9), the shaft of which carries a pulley 72 having a belt 74 connecting with a pulley 76 secured to a horizontal shaft 78. The latter shaft is journaled in bearing brackets 80 and 82 mounted on side frames 81 and 83, respectively. Operation of the motor thus causes rotation of the shaft 78 in the direction indicated by the arrow. A second pulley 84, fastened to shaft 78, has a belt driving connection 86 (see also Fig. 5) with a pulley 88 secured to a stub shaft 90. A gear 92 carried by shaft 90 meshes with a gear 94 on a longer shaft 96 to connect the latter shaft directly with the drive mechanism just described. Shaft 90 is carried by a bearing support plate 91 extending upwardly from the side frame 81, and shaft 96 is journaled in plate 91 and side frame 83. A gear 97 on shaft 96 meshes with a gear 98 (Figs. 5 and 8) on an inclined shaft 100. The latter shaft carries a roller 102 which normally engages an idler roller 103 resiliently carried by a bracket 104. The rollers 102 and 103 are employed in card ejecting operations to be considered later.

Figure 11:
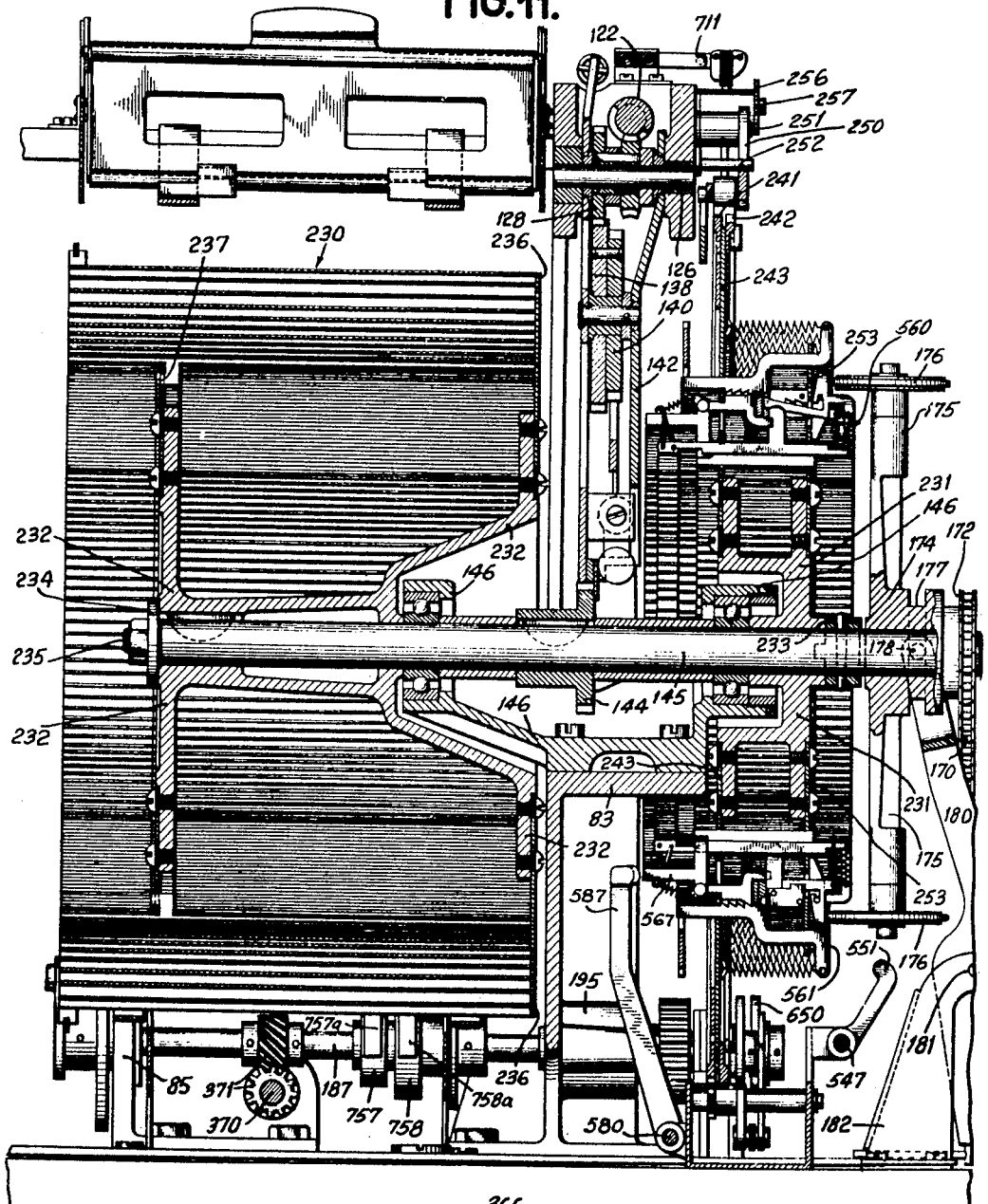
Fig. 11 is a sectional view along line 11—11 of Fig. 8.
Figure 36:
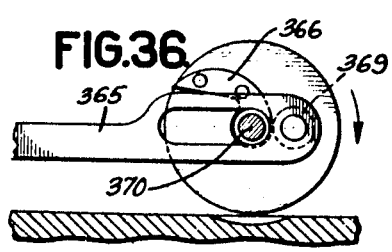
Fig. 36 is a detail section taken at 36—36 of Fig. 27, showing the operating cam and follower arm which supply the movement for printing operations.

Returning now to shaft 78, it will be noted that a worm gear 106 (Fig. 6) carried by the end of this shaft meshes with a gear 108 secured to a vertical shaft 110 and, therefore, shaft 110 also forms part of the motor driven structure, serving as a common connecting medium for a plurality of horizontal shafts to be described presently. The vertical shaft is journaled in bearing brackets 111 and 112 connected to side frame 83 and is provided with three gears other than gear 108. One of these gears, designated 114, engages gear 116 on a shaft 118 which is rotatably mounted in bearing brackets 119, 120 (Fig. 8) at the top of the side frame. The forward end of shaft 118 carries a worm gear 122 which drives a gear 124 immediately beneath it (see also Fig. 12). Gear 124 is secured to a stub shaft 126 which also carries a gear 128. The latter gear drives gear 129 on another stud shaft 130. A gear 131, also fastened to the shaft 130, drives an idler gear 132 which in turn engages a gear 134 freely mounted on shaft 135. Gear 134 is integral with a clutch ratchet 136 so that the gear and the ratchet rotate together as a unit, although shaft 135 normally remains stationary. Gear 128, of the gear train just described, also drives a large gear 138 in a counterclockwise direction, as viewed in Fig. 12. On the face of the gear 138 is a clutch ratchet 140 which moves with the gear as a unit. The gear and ratchet are rotatably mounted on a stud 141 carried by sector gear plate 142. The sector gear 142 is pivotally supported on shaft 126 and meshes with gear 144 keyed to a shaft 145 supported by a large double bearing bracket 146, as best illustrated in Fig. 11.

Shaft 145 and sector gear plate 142 are normally idle since clutch ratchet 140 normally is freely rotatable about its axis 141. However, upon engagement of a pawl 147, pivoted at 148 on plate 142, with the ratchet 140, free rotation of the ratchet is interrupted and the drive from gear 128 causes the sector gear 142 to move in a clockwise direction, thereby driving gear 144 and shaft 145 in a counterclockwise direction, as viewed in Fig. 12. The engagement of pawl 147 with ratchet 140 is effected by reason of the connection of the pawl with the armature 149 of a solenoid 150. Energization of the solenoid engages pawl 147 with the ratchet 140 and in doing so stretches a pawl return spring 151. A keeper arm 152, provided with a roller 153, drops under the engaged pawl 147 to hold the pawl in its engaged position. The keeper arm is pivoted to a lever 154 connected to the armature 155 of a coil 156 of a pair of coacting solenoids 156 and 157. Coil 157, through its armature 158 and connecting arm 159, serves to increase the magnetic force of attraction exerted on armature 155 when the solenoid is energized. Movement of armature 155 to the rigt upon energization of solenoid coils 156, 157 causes movement of lever 154 which stretches a return spring 160 connected to the lever. A projection 154a moves keeper arm 152 up out of the way of pawl 147 to permit spring 151 to return the pawl to normal. It is now evident that solenoid 150 controls the engagement of pawl 147 and solenoid coils 156, 157 the disengagement of the pawl from ratchet 140. It will be noted that all of the parts just described are carried by sector gear plate 142.

Returning once more to the vertical shaft 110, it will be noted that another of the gears, designated 162 (Figs. 6 and 9), on that shaft meshes with a gear 164 secured to one end of a shaft 165 which is journaled in a special bearing bracket 166 fastened to the base of the machine. A sprocket wheel 168 is pinned to the other end of shaft 165 and is connected by a chain 170 with a sprocket wheel 172 which is freely mounted on the right end of shaft 145, as viewed in Fig. 11. Attached to the sprocket wheel is a large hub 174 with a pair of large spokes 175 extending outwardly therefrom 180° apart and carrying freely mounted rollers 176. Rotation of sprocket wheel 172 causes the hub 174 and its associated parts to be revolved freely about shaft 145. The hub is also provided with a recessed portion 177 which is engaged by a pair of pins 178 extending from the upper U-shaped part of an operating arm 180 pivoted on a short shaft 181 carried by bracket 182. One of these pins is shown in Fig. 11 and the other pin is aligned with the pin shown but is on the opposite side of hub 174. The arrangement is such that the entire hub assembly including arms 175 and rollers 176 may be moved to the left a limited distance along shaft 145 by the operating arm 180 for the purpose of resetting the individual card locating mechanisms to be described later.

The remaining gear on vertical shaft 110 to be considered is designated 185 and is located at the lower end of the shaft. Gear 185 drives a train of gears including gears 186, 188, and 190, as best illustrated in Fig. 16. Gear 186 is loosely mounted on a shaft 187 and is connected directly with a clutch ratchet 191 through the medium of a sleeve 192. Accordingly, the gear 186 and ratchet 191 are rotated with the remainder of the drive mechanism, but shaft 187 normally remains idle. Shaft 187 is journaled in a large bearing 195 carried by the side frame 83 and in a bearing bracket 85 (Fig. 11) secured to the base of the machine. Gears 188 and 190 are mounted on short shafts 193 and 194 supported by side frame 83. Gear 188 is an idler gear and transmits movement to gear 190 which normally rotates freely about shaft 194. Gear 190 is integral with a clutch ratchet 196 and hence the ratchet moves with the gear as a unit.

The structure described above has included the entire mechanism which is directly connected with the drive motor and also the clutching arrangement employed to cause the motor to drive the card rack. The next step is to describe the various other units of the machine and show how these units are connected with the drive mechanism to perform essential machine operations.

*Card handling mechanism*

Figure 7:
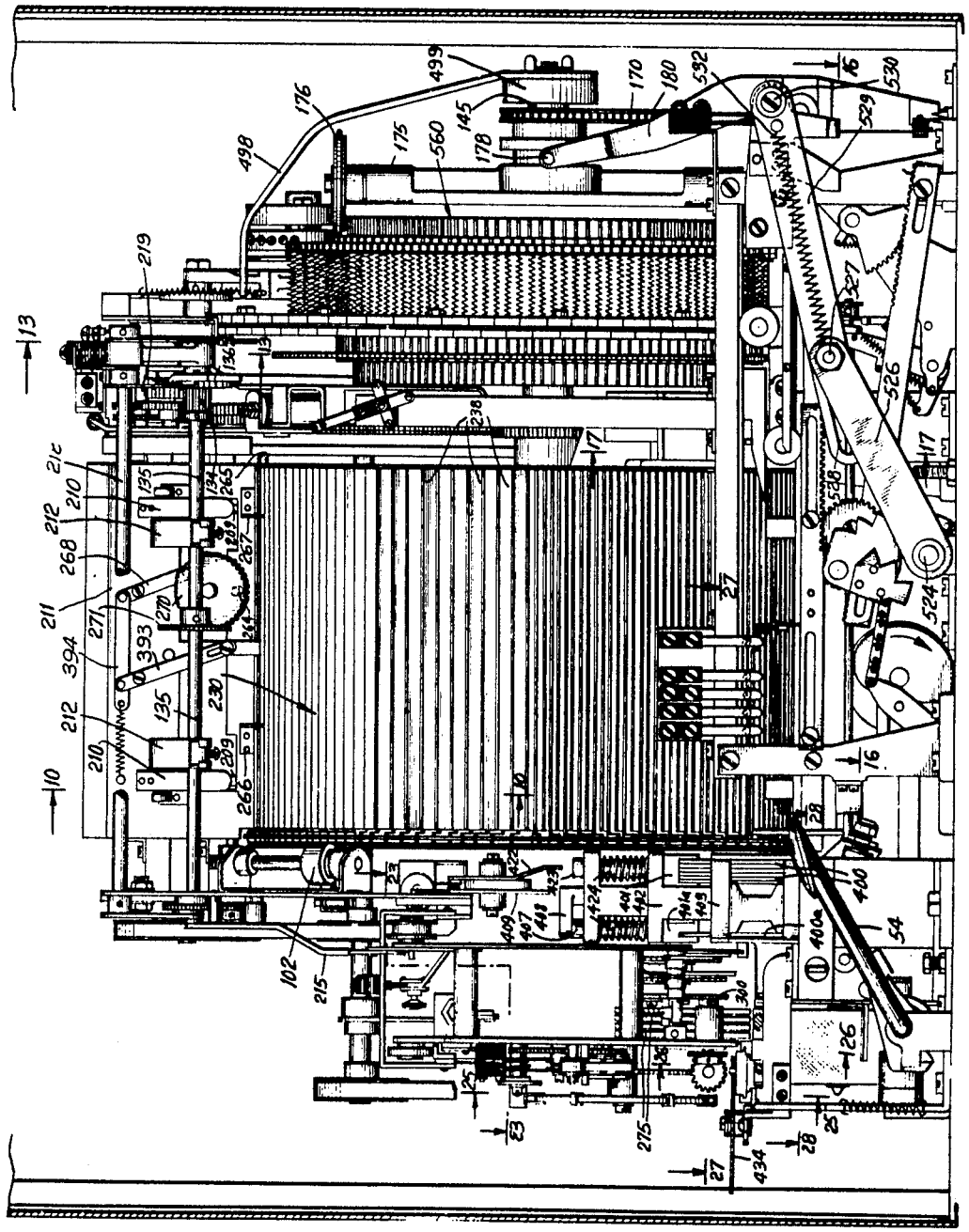
Fig. 7 is a front elevation view of the machine with the cover removed.
Figure 10:
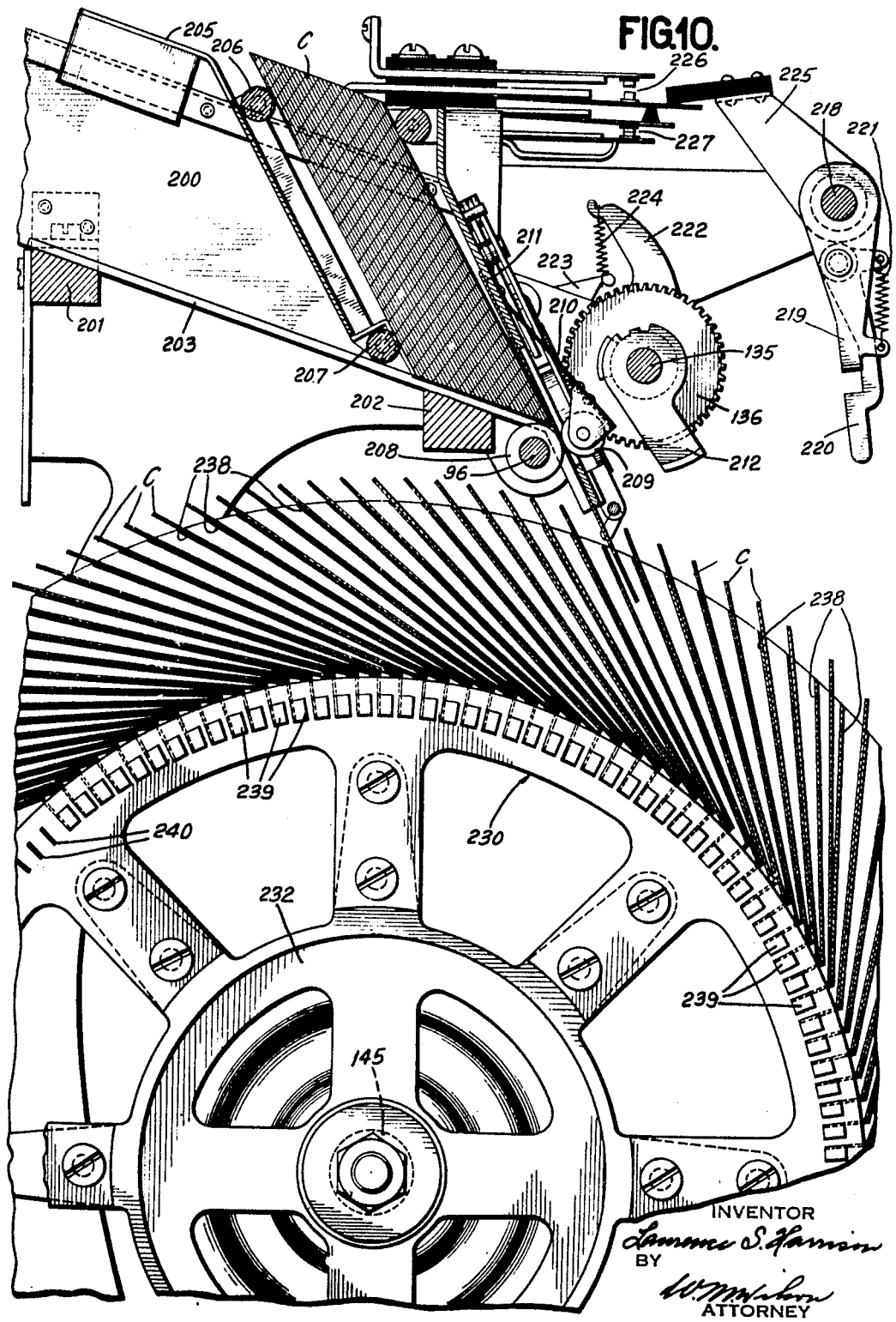
Fig. 10 is a sectional view taken at 10—10 of Fig. 7 showing the card feed mechanism for filling the card rack.

*Card hopper.*—Referring now particularly to Fig. 10, a card hopper 200 is located at the top of the machine and is supported by cross bars 201 and 202 secured to the side frames. The base of the card hopper comprises an inclined plate 203. The cards are placed in the hopper top edge down and face to the rear and are backed by a weighted plate 205 provided with rollers 206 and 207. Roller 206 rides on the top of the side plates of the hopper, whereas roller 207 rides on the inclined base plate 203. The effect of the weighted plate 205 is to urge the cards forward toward the front of the hopper. The foremost card is then in such a position that its lower edge is approximately aligned with the engaging point of feed roll 208 and cooperating rollers 209. Feed roll 208 is fixed on the shaft 96 and the rollers 209 are carried by spring members 210 secured to the front plate 211 of the card hopper (Fig. 7).

Card feeding operations are effected by card pickers 212 which are provided with sponge rubber tips 212a (Fig. 8) to promote greater friction between the pickers and the foremost card in the hopper at the time of engagement. The pickers 212 are secured to the shaft 135 which, as previously explained, normally remains stationary. The necessary movement of this shaft for card feeding purposes is effected by moving the lower part of an arm 215 (Fig. 5) to the left. Arm 215 is pivoted to the left side frame and is connected through a link 216 and arm 217 with a shaft 218 extending from one side frame to the other. Movement of arm 215 thus causes shaft 218 to be rocked counterclockwise. Connected to the shaft at a point near the right side frame is a latch arm 219 carrying a pivoted latch 220 (Figs. 10 and 12). The latch is biased against a part of the arm 219 by means of a spring 221. A dog 222, pinned to shaft 135, normally extends under arm 219 and over the latch point of latch 220, as shown in Fig. 12. The dog carries a pivoted pawl 223 aligned with ratchet 136 and biased toward the ratchet by a spring 224. The pawl is normally withheld from the ratchet by the latch arm 219 but, upon counterclockwise movement of shaft 218, the latch arm 219 is moved away from its latching position to permit pawl 223 to engage ratchet 136 and thereby connect shaft 135 with the driving mechanism of the machine. Fig. 10 illustrates the operated position of the clutch by reason of which the shaft 135 has been rotated part of the way through one revolution. As pickers 212 go through one revolution, the foremost car is engaged and moved down between rolls 208 and 209. Meanwhile, another arm 225, pinned to shaft 218, has opened a set of normally closed contacts 226 and closed a set of normally open contacts 227 for purposes to be described later.

*Card rack.*—The feed rollers 208 and 209 move the cards one by one into a large cylindrical card rack 230 keyed to shaft 145 (see also Fig. 11). The card rack structure comprises a heavy framework 232 held on shaft 145 against bearing 146 by a collar 234 and a large nut 235. Screwed to each end of the framework 232 are thin metal side pieces 236 and 237 to which are fitted a plurality of metal sheets 238. The sheets 238 have tab portions 239 interfitting with slots 240 in the side pieces 236 and 237 and are bent so as to extend outwardly from the framework at an angle with respect to the radial direction. The result is that the sheets 238 form a plurality of card pockets around the periphery of the framework 232, these pockets being somewhat triangular in cross-section with openings at the outer edges to receive cards. The pockets are deep enough so that the inserted cards extend out just beyond the outer edge thereof and the capacity of the card rack is one card for each pocket. In order that all the different card pockets may be filled automatically from card feeding mechanism, it is necessary that the feeding of the cards be accompanied by a coordinated stepping of the card rack to present the card pocket openings successively in position to receive cards from hopper 200.

*Card rack stepping mechanism.*—Mounted near the right end of shaft 145 is a large bearing 231 (Fig. 11) keyed to a hub 233 which is pinned to the shaft. At the left end of bearing 231 is fastened a large disk 243 carrying ratchets 241 and 242 mounted on the disk near its periphery. At the right end of bearing 231 is a disk 253 which serves in conjunction with disk 243 to support the individual card locating mechanisms to be described hereinafter. Since the disk 243 is secured to the same shaft as the card rack 230, these members move together as a unit. The details of the mechanism for causing such movement are shown in Figs. 13 and 14.

Fig. 13 shows the normal, latched position of the mechanism. In this position, an arm 244 secured to shaft 218 is seated upon the upper latch point of a latch arm 245 which is pivoted loosely about shaft 135 and normally holds a detent 247 and a pawl 248 out of engagement with the ratchet teeth of ratchets 241 and 242. In the position shown, the detent 247 is supported directly by the arm 245 against the bias of a return spring 246, and the pawl 248 is supported by the engagement of arm 245 with a pin 249 on the pawl. Pawl 248 is pivotally carried by an L-shaped member 250 mounted for rotation about a short shaft 251 carried by the right side frame. The member 250 is held in a normal position against a stop 252 by the action of spring 253. A cam 255 is pinned to the shaft 135 and is provided with a cam follower arm 256. The follower arm is pivoted at 257 and provided with a downwardly extending portion 258, the lower end of which is arranged to cooperate with a slot 260 in the disk 243 at a certain time under control of the cam 255 for a purpose which will be explained presently. Also pinned to shaft 135 is an operating arm 262 which is aligned for engagement with the L-shaped arm 250.

Referring now to Fig. 14, counterclockwise movement of shaft 218 by its actuating lever 215 (Fig. 5) to initiate movement of shaft 135 for a card feeding operation described hereinbefore, also causes movement of the end of arm 244 to the lower step of latch arm 245, permitting limited rotation of the latch arm about the shaft 135. The left end of arm 245 is then withdrawn from engagement with detent 247 permitting the detent to move into engagement with the ratchet teeth. Likewise, the pawl 248 is lowered into engagement with the ratchet. As shaft 135 rotates, arm 262 contacts arm 250 and moves the latter arm to the left, causing pawl 248 to move the disk 243 and its connected mechanism, including the card rack, to the left a limited amount. As soon as the disk has been rotated a short distance, the arm 262 goes past the end of arm 250 and the latter arm, together with pawl 238, is withdrawn once more to its rightward position. Detent 247 cooperates with the ratchet teeth to prevent any backward movement of the disk 243. It will be noted that the stepping of the disk will continue until every card pocket has been brought into alignment in succession with the card feeding mechanism because of the fact that the presence of the arm 244 on the lower step of latch 245 prevents shaft 218 and, hence, arm 219 from returning to normal position. Thus, each rotation of shaft 135 causes the feeding of a new card into a different pocket of the card rack, and the stepping of the rack is such as to correspond with the distance between the card pockets. After the rack has been completely filled, the lower extension 258 of cam follower arm 256 drops into the slot 260 in the side of the disk under the influence of gravity and the bias of a connected spring 254. This movement causes a projection 259 on arm 256 to move the right end of latch 245 downwardly against the action of spring 261 so as to permit arm 244, shaft 218, and arm 219 to restore to normal, thereby latching up the card feeding and rack stepping mechanisms. The card rack is restored to its home position by a return spring 263 (Fig. 12) which connects with the top of sector gear plate 142. Since the pawl 248 and detent 247 are now removed from the ratchet teeth of the disk 243, the action of spring 263 is effective to drive sector gear plate 142 counterclockwise and gear 144 clockwise to rotate shaft 145 and, hence, the card rack 230, in a clockwise direction, as viewed in Fig. 12.

Figure 5:
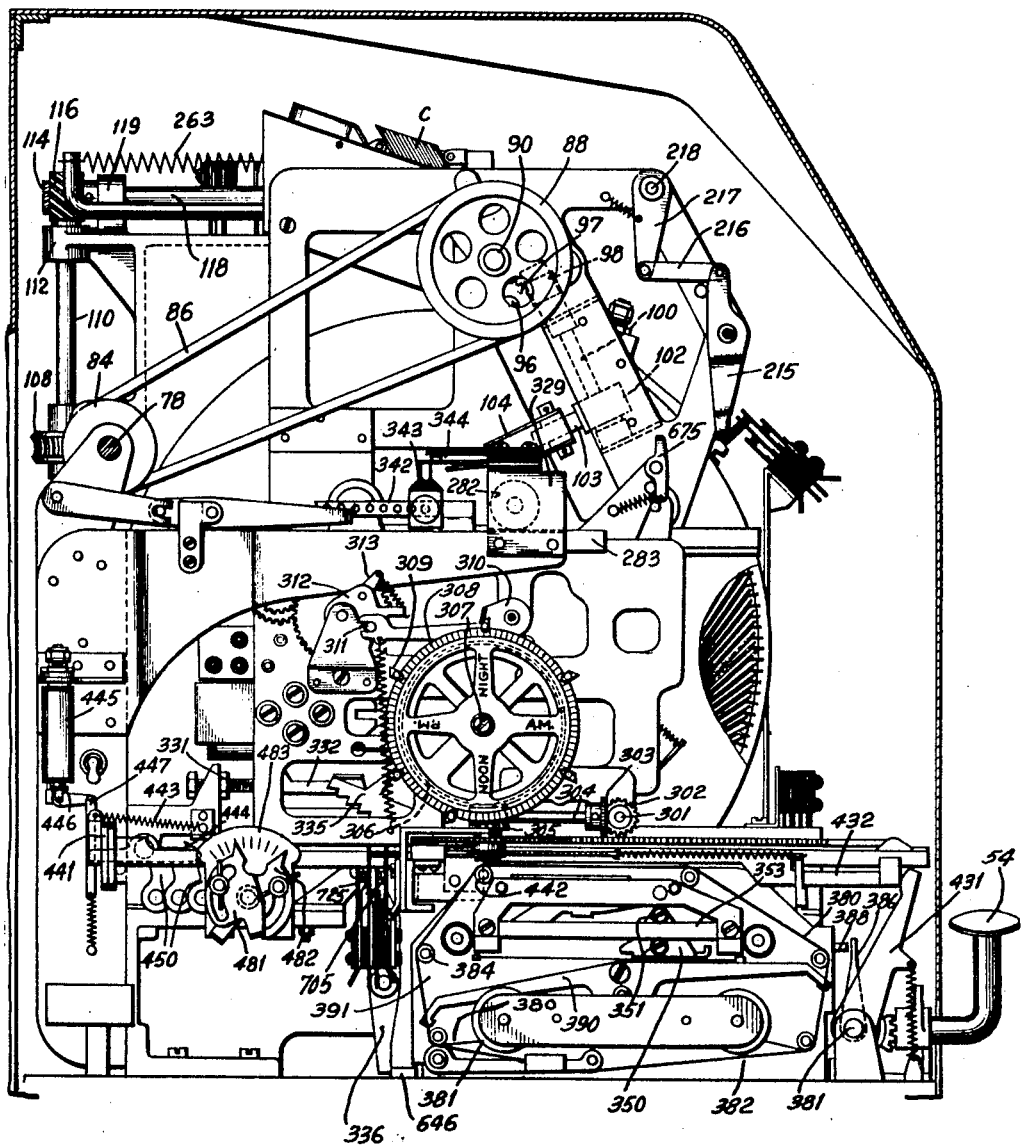
Fig. 5 is a section taken through the cover of the machine at 5—5 of Fig. 1, showing a left side elevation of the mechanism within.

*Card eject mechanism.*—The card feeding operations just described are generally accompanied by the ejection of old cards from the card pockets by means of eject arm 265 (Fig. 7) slidably carried by brackets 266 and 267 secured to the front plate 211 of the card hopper. The eject arm 265 is connected to an arm 393 which in turn is connected by means of a link 394 to an arm 268. The latter arm is engaged periodically during card feeding operations by a pin 264 on a gear 270. Gear 270, in turn, is driven from shaft 135 through a gear 271. Accordingly, during each rotation of shaft 135, pin 264 engages arm 268 to move the eject arm 265 to the left to engage the upper right corner of the card and force it between the eject rollers 102 and 103 (Fig. 5). The timing is such that an old card is removed from the card pocket before a new card is fed into that pocket. Eject rollers 102 and 103 move the card rapidly out to the left where it may be deposited in any convenient receptacle (not shown).

*The time type wheel unit*

Figure 23:
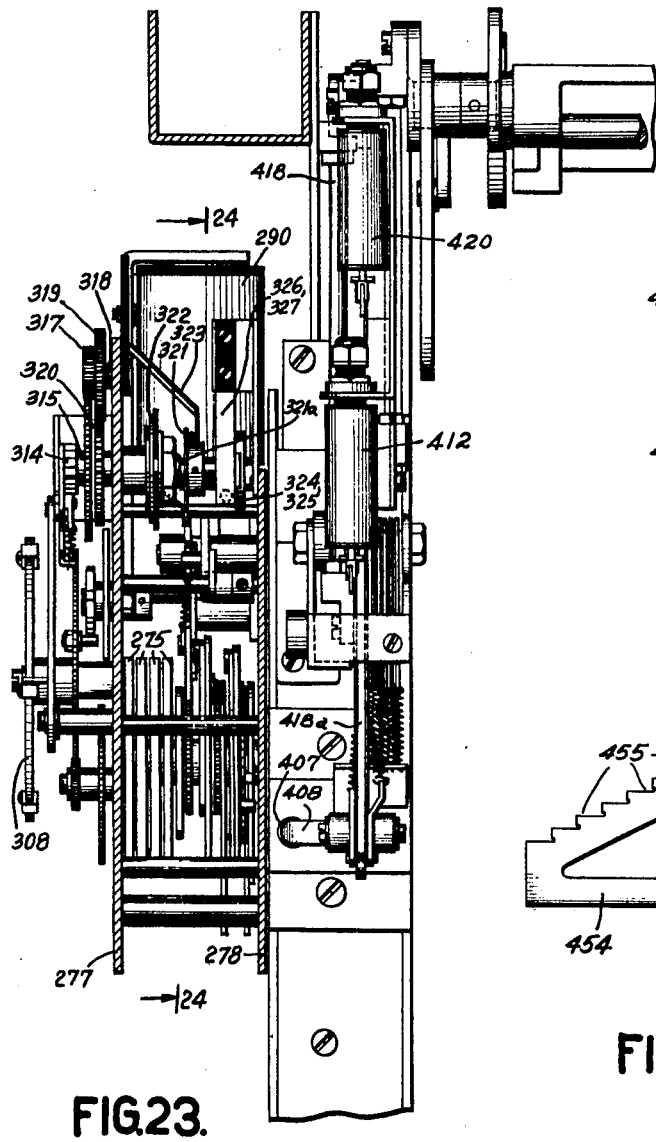
Fig. 23 is a section taken approximately along lines 23—23 of Fig. 7, showing the type wheel unit carriage assembly.
Figure 34:
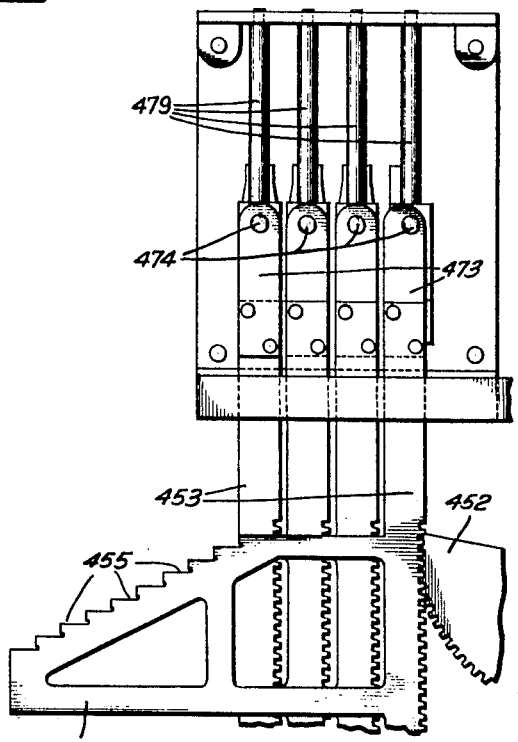
Fig. 34 is a section taken at 34—34 of Fig. 33.

The type wheels, generally designated 275 (Fig. 23), are mounted on shaft 276, extending between a pair of spaced side plates 277 and 278. The side plates are part of a carriage structure which is provided with rollers 279 and 280 (Fig. 24) for movement along a guide rail 281. The side plate 277 is provided with the roller 282 (Figs. 5 and 37) which rides along a guide rail 283.

Figure 24:
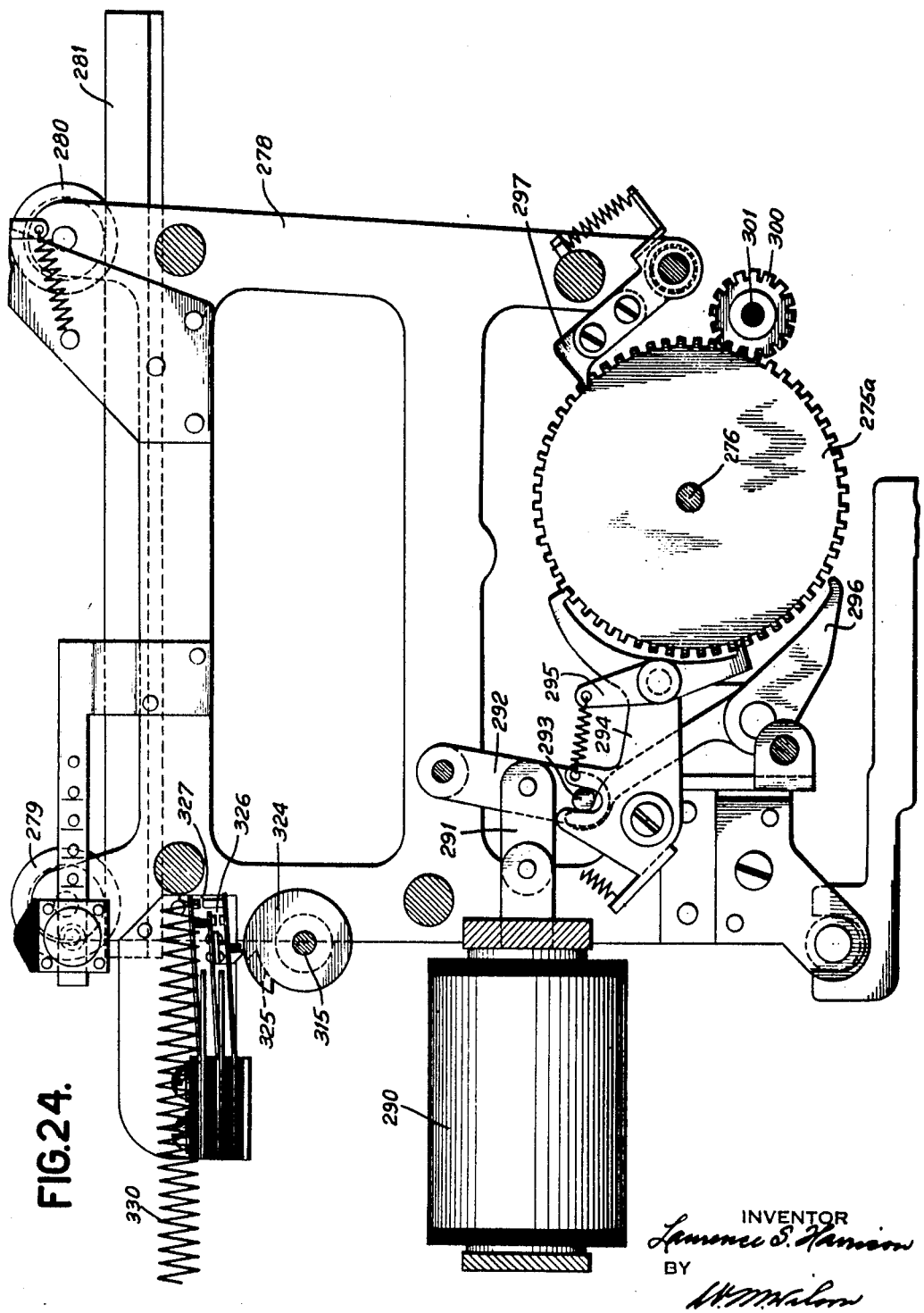
Fig. 24 is a section on line 24—24 of Fig. 23.

The mechanism for stepping the type wheels is shown in Fig. 24 to be controlled by a magnet 290, the armature 291 of which connects with a pivoted arm 292 provided with a pin 293 which engages a pawl carrying arm 294. Mounted on arm 294 is a pivoted pawl 295. The end of arm 294 and pawl 295 cooperate with the type wheel drive ratchet 275a to advance the latter ratchet a predetermined amount in a counterclockwise direction, upon each energization of the magnet 290. The type wheels are arranged so that one of the wheels, usually the minute wheel, moves with the ratchet and the other wheels are advanced by any well known carry mechanism. In the present disclosure, the magnet 290 is energized once each minute by a simple circuit represented in Fig. 42, in which a cam 285 driven from a suitable master clock mechanism 285a closes a contact 286 once every minute to send a pulse directly to magnet 290. Energization of magnet 290 by this pulse causes the advance of the minute type wheel one position in the manner just described. Pawl 296 serves as a detent in the operation of the type wheel ratchet 275a as does pawl 297. A small gear 300 is secured to a short shaft 301 carried by the side plate 277 and is rotated upon each movement of type wheel ratchet 275a with which it is engaged. Also fastened to shaft 301 is a gear 302 (Fig. 5) meshing with a gear 303 which is pinned to a shaft 304. A worm gear 305 (see also Fig. 25) on the left end of the shaft 304 meshes with the gear 306 which is mounted on a shaft 307. The latter shaft also carries a program wheel 308. Accordingly, the energization of magnet 290 is accompanied by the stepping of the minute type wheel one position and the movement of program wheel 308 a corresponding amount.

*Program control mechanism.*—The program wheel 308 carries attachable operating elements 309 at various locations around its periphery in accordance with the desired working schedule. These elements cooperate with a pivoted arm 310, the left end of which is bifurcated and engages a pin 311 upon an arm 312. The latter arm carries a pivoted pawl 313 (see also Fig. 37) adapted to engage with a ratchet 314 on a shaft 315. Connected to the ratchet 314 is a gear 316 which meshes with a smaller gear 317 on shaft 318. Gear 317 is integral with a larger gear 319 arranged to drive a gear 320 fixed to shaft 315. The shaft 315 extends between carriage side plates 277 and 278 and carries a conductor ring 321 (Fig. 23) with an arm 321a which engages a stationary commutator disk 322. Both the ring 321 and the commutator 322 are insulated from shaft 315. A contact finger 323 provides means for connecting ring 321 with external electrical circuits. The purpose of this commutator will be explained later in connection with the circuit diagram. Also mounted on shaft 315 are a pair of cams 324 and 325 (Fig. 24) which operate a contact assembly comprising contacts 326 and 327, the cams being effective to control the make and break times of the contacts.

Figure 37:
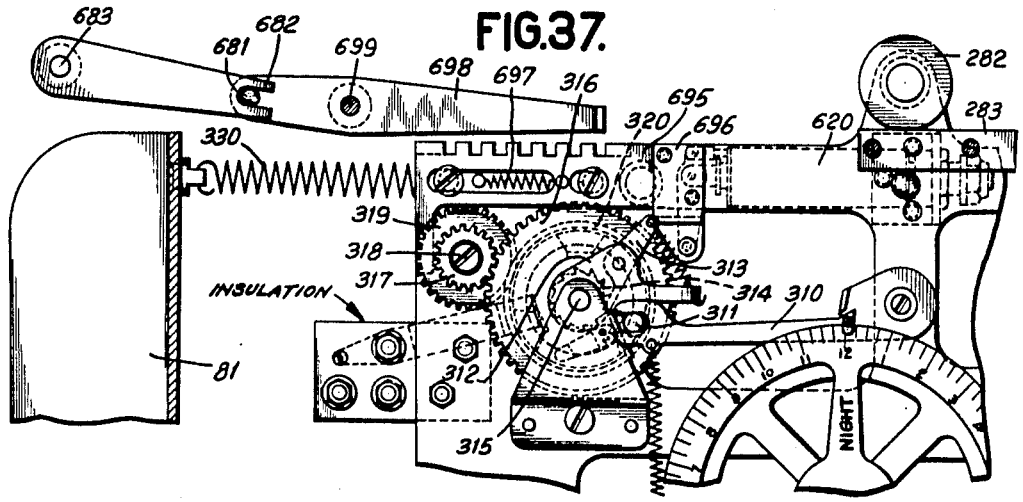
Fig. 37 is a detail of part of the upper portion of the type unit carriage, showing the program controlled mechanism.
Figure 25:
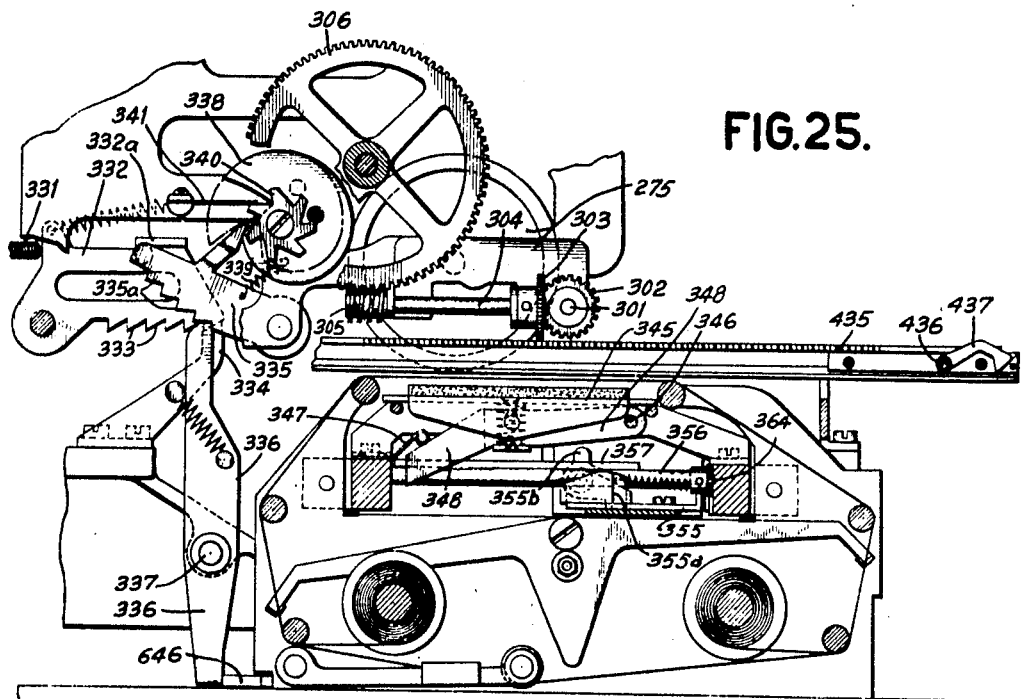
Fig. 25 is a partial section taken just about at the extreme left of the machine, looking toward the right in Fig. 7. This view shows the type wheel unit carriage and part of the punch operating mechanism.
Figure 26:
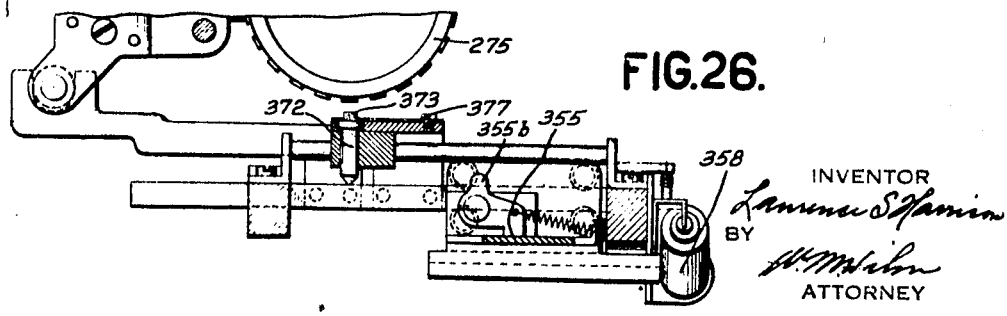
Fig. 26 is a detail section taken just behind the section shown in Fig. 25.

*Carriage positioning mechanism.*—The carriage is normally held in its rearward position by a return spring 330. In this position it rests against a stop 331 (Figs. 5 and 25). Actually, the stop 331 engages a pivoted pawl 332 which has downwardly extending teeth 333 adapted to be engaged by a stationary pawl 334. Another pawl 335 is arranged to be engaged by the upper end of an operating arm 336 pivoted to the side frame at 337. The movement of arm 336 about 337 causes forward movement of pawl 335 and, hence, forward movement of the complete carriage structure, including the type wheel unit 275. This has the effect of changing the printing line position of the type wheels, the change being made once a day as illustrated by the time records shown in Fig. 4. Pawl 335 is provided with a series of steps 335a, one or the other of which engages arm 336, in accordance with the position of a cam 338 with which pawl 335 engages. A bent over portion 332a of a pawl 332 extends over the pawl 335 so that when pawl 335 drops off the deep step of cam 338, under the urging of spring 339, pawl 332 will be raised above the stationary pawl 334 so as to permit free return of the carriage to the left by the carriage return spring 330 (Fig. 37). A similar ratchet 340 is mounted on the face of the cam 338 and is engaged by a detent 341 to insure unidirectional movement of cam 338.

Figure 4:
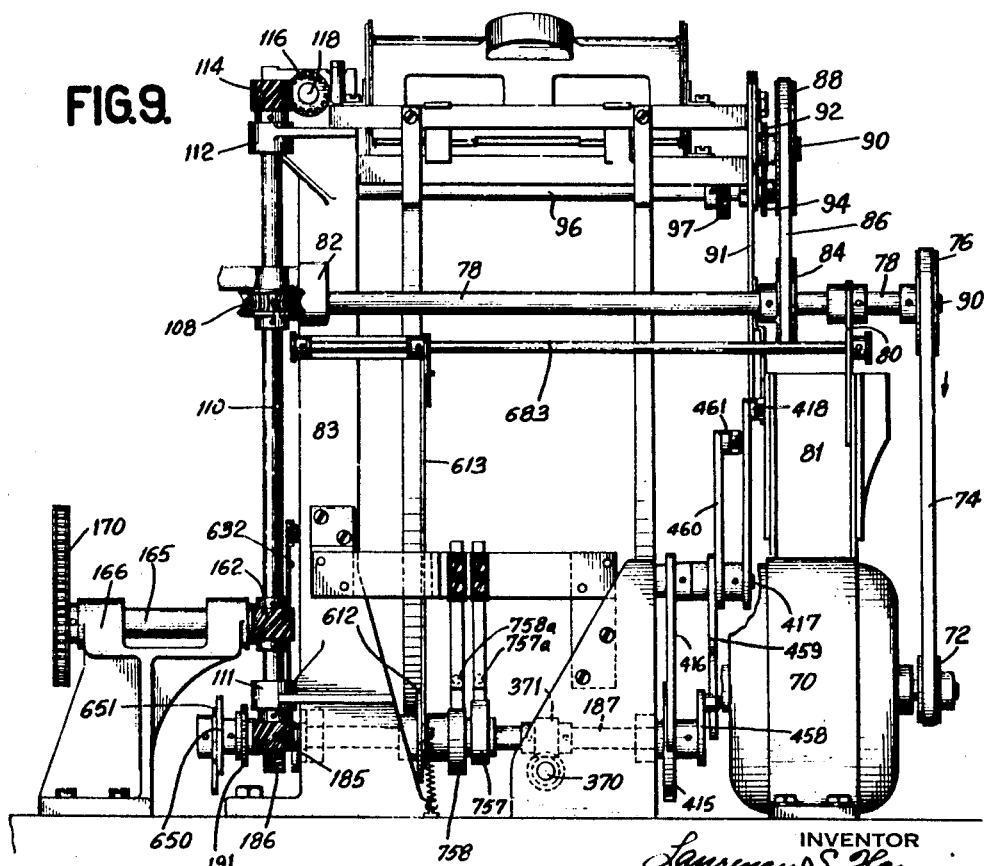
Fig. 4 shows a typical record card with printed and punched data.

Attached at the top of the carriage structure is a fixed arm 342 (Fig. 5) provided with an adjustable slide 343 which is effective to control the operation of a pair of contacts 344 mounted on the left side frame of the machine. The position of the slide 343 is pre-set so as to close contacts 344 when the carriage is in a position which corresponds to the first working day of the payroll period, and to permit the contacts to open for all other positions of the carriage. The example record card of Fig. 4 shows Monday to be the first day of the payroll period and thus the contacts 344 are shown closed with the carriage in the completely returned for, in other words, the Monday position. Only one day of the week is printed in the date column, and the record card shown in Fig. 4 is made up for printing of the last day of the week. Since this date is actually printed on the first day of the week, the date type wheels are adjusted six days in advance of the instant date.

*Platen and ribbon mechanism*

Mounted on the supporting framework beneath the type wheel carriage is a platen 345 (Fig. 25) resiliently carried by an arm 348 mounted on a pivot 346 and held in a retracted position by a spring 347 which operates against the lower end of arm 348 to rotate the latter arm about its pivot 346. It is obvious that upward movement of arm 348 will cause the platen to coact with the type of a token 58, to effect printing. The mechanism which forces the arm 348 upward comprises a slidable assembly, generally designated 350, which is provided with rollers 351 and 352 (Figs. 5 and 29) arranged to ride along guide rails 353 and 354. Mounted on the slide 350 is a pivoted cam arm 355 (Figs. 28 and 29) which straddles a shaft 356. When the slide is moved toward the rear of the machine, in a manner which will be explained presently, shaft 356, carrying a bail portion 357 is rocked so as to move cam arm 355 inwardly against the biasing action of connected spring 328, so as to align arm 355 with arm 348. Thereafter, as rearward movement of the slide continues, the front cam surface 355a of cam arm 355 forces arm 348 upwardly, causing upward movement of the platen 345. The rocking movement of shaft 356 is effected under control of a solenoid 358 which operates an armature 359 connecting with an arm 360 secured to a pivot shaft 361. Another arm 362 secured to shaft 361 connects with a link 362a to operate a small sector gear 363 which meshes with an engaging gear 364 carried by the end of shaft 356. The arrangement is such that energization of solenoid 358 causes a limited rocking movement of shaft 356 to align cam arm 355 with arm 348.

The movement of slide 350 is effected by the movement imparted to arm 365 (Fig. 27) by a cam 366. The arm 365 is connected to an end of a lever 367 pivotally mounted on the base of the machine and biased in a counterclockwise direction by a spring 368 in order to hold a roller 369 on arm 365 against the contour of the cam 366. Cam 366 is pinned to shaft 370 which in turn is geared to the normally idle shaft 187 through a gear connection 371. The clockwise movement of lever 367, effected upon operation of cam 366, causes similar movement of a sector gear 375 which engages with a rack member 376 (Fig. 28) integral with the slide 350. The slide is thereby moved toward the rear of the machine to effect operation of the platen 345 as previously described in the event that solenoid 358 has been energized.

It will be noted that the pivoted arm 355 carries another camming element 355b pivoted to the arm and held in position by a spring 349 connected thereto. Whenever arm 355 is moved to its operated position, cam element 355b cooperates with the lower end of a plunger 372 the upper end of which carries a platen 373 hinged to a bracket 377. Another platen 374 is also hinged to the bracket 377 and is operated every time the slide is moved to the rear by reason of the cooperation of a pivoted camming pawl 378, carried by a bracket 379 on the slide, with the lower end of a plunger 384 connected to the platen 374. The pawl 378 is held in normal position by a spring 383 and is effective to operate the platen 374 on the rearward movement of the slide, and to merely stretch the spring 383 rather than operate the platen on the forward or return movement of the slide.

In the example card shown in Fig. 4, it is seen that the initial recording on the initial day of the week includes the printing of the man's name and number by the operation of the platen 345 toward the type on the token, the printing of the date of the last day of the week by the operation of platen 373 toward the month and day type wheels which are directly above platen 373, and the printing of the time by the movement of the platen 374 toward the hour and minute type wheels which are mounted directly above the latter platen. After the initial recording on the first day, the platens 345 and 373 are rendered inactive for the remainder of the weak by reason of the failure of solenoid 358 to again energize, as will be explained later with reference to the circuit diagram. Thus, platen 374 alone becomes effective upon the next insertion of the token to print the time.

*Ribbon mechanism.*—The mechanism for controlled movement of the ribbon 380 (Fig. 5), upon each printing operation, is operable from the manual control lever 54. The ribbon is mounted on spools 381 and 382 carried by a supporting plate 391 which also carries guide rolls 392 for guiding the ribbon on the prescribed path from the spool 381 to spool 382, or vice versa depending on the direction in which the ribbon is being moved. The ribbon feeding movement is effected from an arm 386 fixed to a shaft 387 which is rocked in a counterclockwise direction upon operation of the manual control lever 54 to move a pin 388 to the left as viewed in Fig. 5, which movement causes feeding of one of the ribbon spools in the manner well known in the art. The pivoted lever 390 controls the reversing of the ribbon after the ribbon is well toward the end of one or the other of the ribbon spools, which operation is also well known in the art and therefore need not be described.

*Punching mechanism*

The punching elements 400 (Figs. 7 and 32) have their upper ends slidably fitted in a grooved operating bar 401 which is movable up and down within a housing 402. The punches extend through slots in a frame member 403 and also through guideways in slidable bars 470. The latter bars each have an upper portion which serves as a stripper and a lower portion which serves as a die, slots 404 and 405 being provided in the stripper and die, respectively. Separating the die and stripper portions of each of the bars 470 is a long horizontal slot into which the record card C is fed for recording operations in a manner to be explained presently. The punching stroke is effected by downward movement of the punch operating bar 401 which forces the punches 400 through the card and into the die slots 405. The punches 400 are used for perforating the card to represent the man number and the department number. There is also provided a separate punch 400a for working time credit punching. This punch is operated from a grooved bar 401a. A pair of plungers 407 and 423 connect with punch operating bars 401a and 401, respectively, to operate the punches. The return of the punches to normal is effected by coil springs 424.

A bridge member 408 mounted to slide vertically in the housing 402 has an arm extending over the top of plunger 407. Above the tops of the plungers is the end of a rocker 418a pivoted on a short shaft 418b mounted on a stationary bracket 475. Pivotally attached to the free end of rocker 418a by a screw 418c are two interposer arms 409 and 422 normally held by springs 409a and 422a in the inoperative position shown. The interposer arms have upwardly extending fingers connected respectively by links 410 and 421 to levers 410a and 421a operated by armatures 411 and 420a of two solenoids 412 and 420. The solenoids are secured upon a stationary bracket 413 and, when energized, swing their respective interposer arms to vertical operative position above the bridge member 408 and plunger 423, respectively.

A cam 415 on shaft 187 imparts movement to a follower arm 416 fixed upon a revolubly mounted shaft 417 (Figs. 32 and 9). Also fixed to the shaft is an arm 416a connected by a link 418 to the rocker 418a. Clockwise movement of arm 416 by cam 415 is transmitted to the rocker 418a, imparting to the latter a rocking movement about its pivot 418b. If either of the interposer arms 409 or 422 has been moved to operative position by its solenoid 412 or 420, the movement of the rocker 418a will force the corresponding plunger 407 or 423 down and punch the record card.

*Punch selecting mechanism.*—The manner in which the punches are selectively positioned for operation will now be described. The token 58 (Fig. 1) is formed with a leading edge 58a which is cut in a particular manner to represent the man number of the employee. When the token is inserted in the guideway 430 (Fig. 27), and the operating handle 54 depressed, the key is moved to the rear along the guideway by an arm 431 (see also Fig. 5) acting on the forward end of rack 432. Movement of the arm 431 and rack 432 is increased through connection of the rack 432 with the gear 433 which is integral with the larger sector gear 434 connected with the rack 435. Mounted on the rack 435 is a pin 436 which carries a spring pressed pawl 437 (see also Fig. 25) which in turn engages the hole in the face of the token and carries the token clear to the rear extent of its travel where it engages a plurality of arms 440 slidably mounted in brackets 441 and 442. The arms 440 are provided with upward extensions at their left ends, as viewed in Fig. 5, to which are connected springs 443 which bias these arms toward the right or, in other words, toward the front of the machine. As the leading edge 58a of the token engages the right ends of these arms, certain of the arms are positioned rearwardly to an extent depending on the cut of the token. A latching pawl 444 grips under the end of the rack 435 to hold the rack and, hence, the token 58 and the arms 440 in their operated position. A solenoid 445 has an armature 446 connected to the pawl 444 by a suitable link 447 to release the rack and the arms 440 at a later time, so that the rack may be returned by spring 448.

For present consideration, however, the rack remains latched and the selected arms 440 remain operated. Arms 440 connect with small operating arms 450 (Fig. 5) which are fixed to one end of each of the shafts 451, the other end of each shaft being connected with a sector gear 452 (Fig. 32). It will be noted that rearward movement of arms 440 when selected by a token causes counterclockwise movement of sector gears 452. Engaging with sector gears 452 are a plurality of vertical slides 453. Carried by each of the vertical slides 453 are abutment portions 454 having a plurality of steps 455.

The actual positioning of the punch elements is effected upon rotation of shaft 187 to cause counterclockwise movement of arm 458 pinned thereto. The end of the latter arm is thus removed from engagement with an arm 459 pivoted at 417. Arm 459 moves downwardly causing shaft 417 and, hence, arm 460 to be moved to the right, as viewed in Fig. 32. Arm 460 is connected through a link 461 to a lever 462 which is fixed to a shaft 463 in such a manner that arm 462 and shaft 463 are moved to the right. A plurality of arms 465 are frictionally mounted on shaft 463 and are connected at their upper end with links 466, which in turn are loosely pivoted on vertically strung wires 467. Links 466 are also connected by springs 468 to a fixed bracket 469 so that the links are biased in a rightward direction. The lower end of arms 465 are connected to the slidable punch carrying bars 470, the connection being made by the end of the arm extending into a slotted portion 471 of the bars 470. Bars 470 carry the punches 400 and serve as dies and strippers as previously described. The movement imparted to slidable bars 470 is interrupted at differential points as the left ends of these bars engage different ones of the steps 455 of the abutment members 454. At the time of engagement, the connected arms 465 slide on shaft 463 because of their frictional mounting. In the event that any one of the vertical slides 453 has not been operated, its corresponding slidable bar 470 will be carried all the way to the rear under movement provided through arms 459, 460, link 461, and arm 462. The vertically strung wires 467 and the springs 468 serve to urge the proper movement of the mechanism just considered when arm 458 is removed from arm 459. Wires 467 are fixed at their upper and lower ends to a stationary bracket 475.

Figure 35:
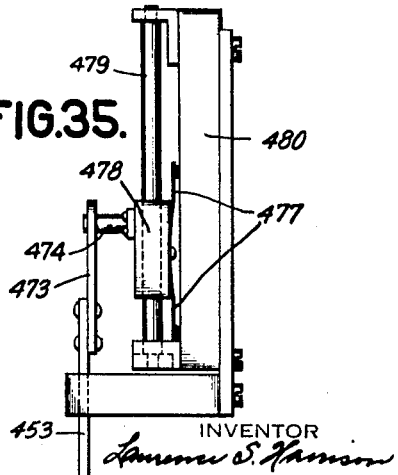
Fig. 35 is a detail view of a portion of the mechanism shown in Fig. 34.
Figure 33:
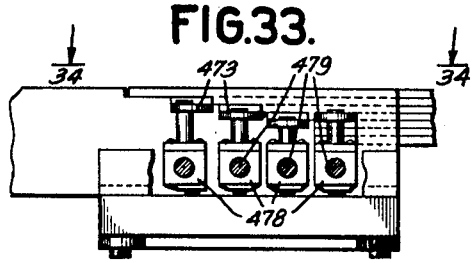
Fig. 33 is a detail sectional view of a portion of the token controlled punch selecting mechanism, the section being taken generally at 33—33 of Fig. 32.

The rectangular member 480 represents a terminal board having rows of individual conductive portions provided with terminal screws 476. Cooperating with each row are contact fingers 477 (Fig. 35) carried by a bracket 478 slidably mounted on vertical rod 479. The upward movement of vertical slide 453 moves bracket 478 with it by reason of the connection through arm 473 and pin 474. Thus, contact fingers 477 are set up to select certain circuits to be described later in connection with the circuit diagram which shows in detail the arrangement of the circuit connections for the conductive portions of the terminal board.

The punch elements described above were set up directly from the token, the selective positioning of the punch elements being effected in accordance with the cut of the leading edge of the token. There is also a predetermined setup device for punching a department number in the card. The predetermined department number is obtained through the medium of a settable device represented in Fig. 5 by a pair of pointers 481 and 482 cooperating with the scale 483. Pointers 481 and 482 are connected to shafts 484 and 485 (Fig. 32), respectively, and set to a certain position punch holes corresponding to the number on the card. Shaft 484 is within shaft 485, and each is connected to a sector gear such as 486. The sector gears cooperate in a manner previously described with vertical slides 453 to position the connected abutment members 454 accordingly. The difference in the operation here is simply that the predetermined setting of the pointers has already moved abutment members 454 to a fixed position, causing the punch carrying bars 470 to seek the same location for each punching operation to perforate every card in the same manner. It will be remembered, however, that whether or not the bars 470 are set up, punching occurs only if either or both of interposer arms 409 and 422 are positioned over the plungers 407 and 423, this operation being under the control of solenoids 412 and 420 as previously described.

*Means for bringing a card to a recording position*

Now that the operation of the printing and punching mechanisms has been considered, the next step is to explain how a particular card is withdrawn from its pocket in the rack 230 and brought into recording position.

Figure 8:
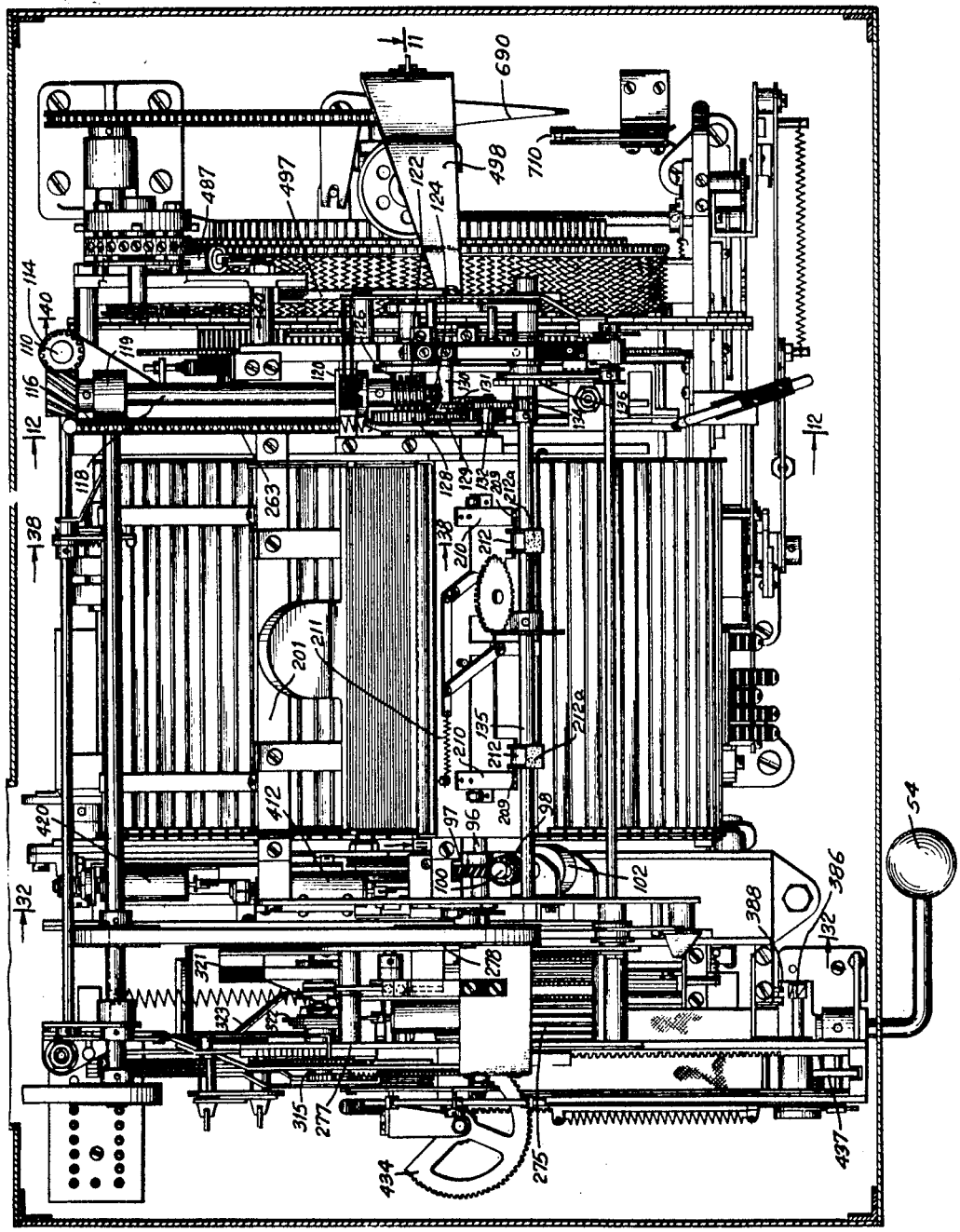
Fig. 8 is a plan view of the machine with the cover removed.

*Selective positioning of card rack.*—At the start of operations, solenoid 150 (Fig. 12) is energized, by a circiut to be explained later, to engage pawl 147 with ratchet 140 so as to cause the motor to drive sector gear plate 142 in a clockwise direction. Movement of the gear plate 142 causes movement of the drum away from its home position against the action of the return spring 263 (Fig. 8). After the drum is rotated a predetermined distance away from its home position, solenoids 156 and 157 are energized to withdraw pawl 147 from its ratchet, thereby disengaging the drum from the drive mechanism. The time of energization of solenoids 156 and 157 is determined by selector circuits set up on terminal board 480 in a manner which will be explained in detail later.

Figure 6:
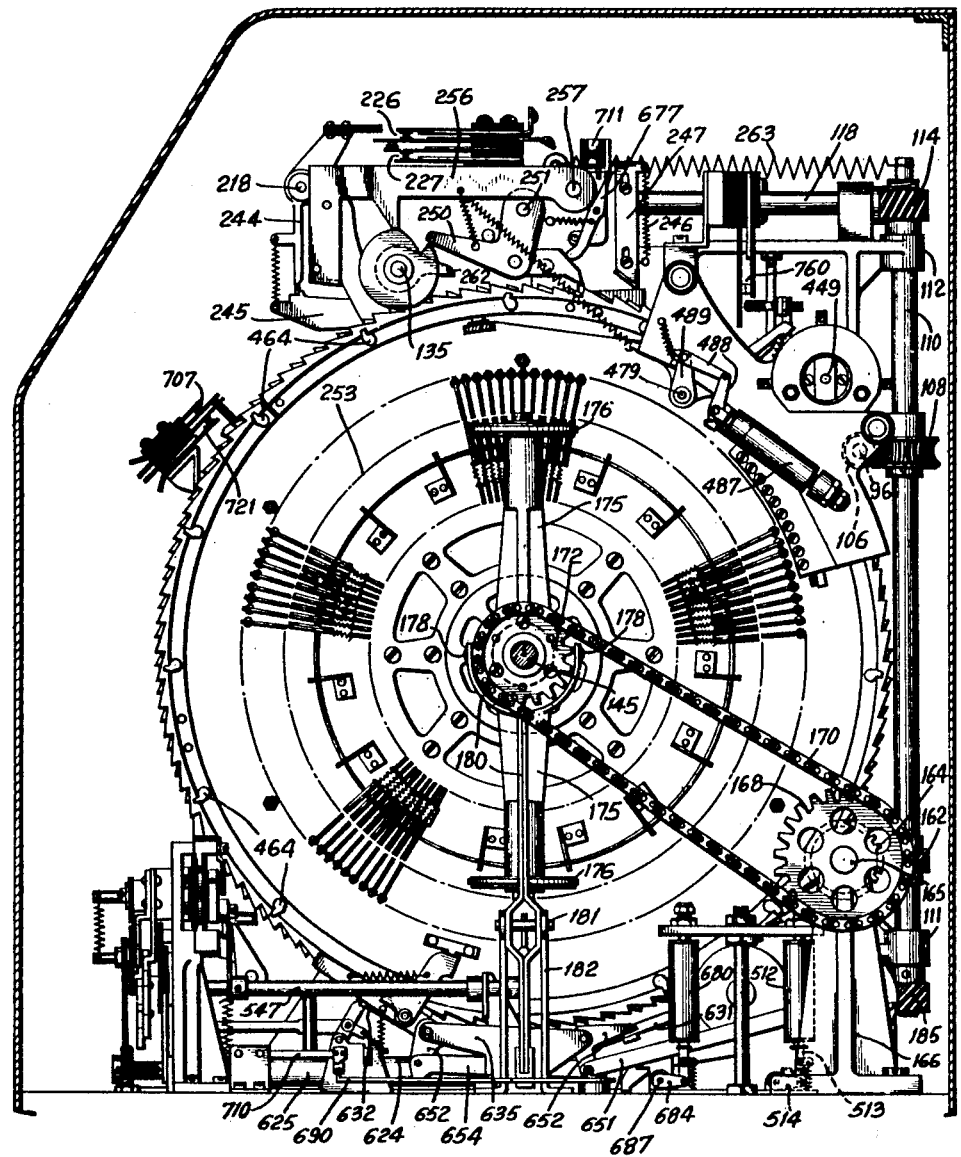
Fig. 6 is a section taken at 6—6 of Fig. 1 showing a right side elevation of the mechanism.

The mechanism which actually halts the rotation of the card rack in the driven direction is controlled by a solenoid 487 (Fig. 6). The armature of the solenoid is connected through suitable linkage 488 with an arm 489 secured to a shaft 479 (see also Fig. 40). The arrangement is such that energization of the solenoid causes a limited amount of counterclockwise rotation of shaft 479 to move an arm 472 away from the end of a pivoted arm 473 to permit arm 473 to be moved counterclockwise to raise the projection 473a into engaging position. The latter projection, when thus positioned, engages stop lugs 464 spaced along the side of ratchet 242 on disk 240. The stop lugs are positioned at five tooth intervals along ratchet 242 which is equivalent to ten card pocket positions since ratchets 241 and 242 are staggered. In other words, the distance between stop lugs represents a zone of ten possible unit stopping positions of the card rack and this zone selection is effected under control of solenoid 487. As projection 473a engages a stop lug 464, the arm 473 and a slidable curved arm 496 are moved downwardly in a path provided by curved guides 425 and 426 fastened to a large backing plate 427 mounted on the right side frame of the machine. To the upper end of the arm 496 is connected a tape 497 which is tied to the top of an arm 498 which is pivoted on the extreme right end of shaft 145 (Fig. 7) and biased by a spring seated in a drum 499.

The curved arm 496 carries a pair of conductive sensing fingers 428 and 429 connected to arm 496 through a bracket 419 made of insulating material. Sensing finger 428 cooperates with a common conductive strip 602, whereas finger 429 cooperates with a plurality of individual segment spots 601. The motion of the card rack is halted when arm 498 strikes against the end of plate 427 to stop the movement of the curved arm 496. In the stopped position, the sensing finger 428 rests on the lowest of the spots 601.

During the movement of the drum, a ratchet 438 is engaged by the stop lugs 464 to be stepped a predetermined distance upon each engagement. A pawl 439 cooperating with the ratchet serves to help prevent overthrow. The ratchet 438 is freely mounted on a shaft 449 but is geared through suitable reduction gearing, represented generally as 414, to drive the shaft 449. Emitter arms 456 and 457 (Fig. 41) are connected to shaft 449 and hence arm 456 turns from one digit segment spot (marked 0 to 9 in Fig. 41) to the next upon each movement of ratchet 448, whereas arm 457 moves a corresponding distance along a pair of common conductive strips 713 and 714. It is the engagement of emitter arms 456 and 457 with the live contacts set up by the terminal board 80, which determines the time for energization of solenoid 487 to stop the card rack at a given zone.

As the card rack is stopped, a magnet 490 (Figs. 17 and 18) is energized for an instant to operate an arm 491, pivoted at 492, the arm being connected to the armature 493 of the magnet. Movement of arm 491 by the magnet causes a brake shoe 494 to be pressed against the side disk of a circular rack 495, connected to the disk 243. The braking action thus effected is sufficient to prevent harmful rebound of the card rack. The brake immediately releases and the return spring 263 of the card rack begins to restore the rack to its home position.

As the rack moves from its zone stop position toward the home position, contact fingers 428 and 429 connect the various spots 601 in succession with common strip 602 to control the time of operation of mechanism for stopping the rack in a unit position within the selected zone. This mechanism is perhaps best illustrated in Fig. 15 and, as shown there, consists of a pair of solenoids 624 and 625 controlling a pair of latching arms 631 and 632, pivoted at 633 and 634, respectively, on a supporting plate 635 (Fig. 6) fastened to the base of the machine. Actually, solenoid 624 has its armature connected to a pivoted latch 626, the upper end of which normally engages the left end of latch arm 631 so as to hold the latter arm clear of the teeth of ratchet 241, and solenoid 625 has its armature connected to a similar latch 627 through a lever 628 and a link 629 to normally hold latch 632 clear of ratchet 242. It is obvious that energization of one or the other of the solenoids will cause its related latch arm to be tripped into engagement with its ratchet to stop the card rack in a unit position.

When the drum has been brought to its selected unit stopping position, the card which corresponds to the inserted key is located so as to be engaged by a card picker assembly, generally designated 500 (Figs. 17, 20, and 21) carrying a pivoted finger 501 which cooperates with a stationary finger 502 of the assembly 500. In the normal retracted position of the assembly, a cam 503 supports the right end of arm 501 to cause a clearance between the other end of movable finger 501 and the stationary finger 502. The picker assembly 500 is mounted on a carriage 505 provided with rollers 506 and 507 which ride along guide rails 508 and 509, respectively.

The driving power for carriage 505 originates from a cam 510 (Fig. 20) on the front end of the shaft 370 which, it will be remembered, is driven from shaft 187, the latter shaft being engaged with the drive mechanism upon energization of a magnet 512 (Fig. 6). Armature 513 of magnet 512 connects with an arm 514 which rocks shaft 515 (Fig. 16) to move a latch 516 forward and thereby release the pawl-carrying arm 517 and a pawl 518 for engagement with ratchet 191. The pawl carrying arm 517 is pinned to the end of shaft 187. Consequently, upon engagement of the pawl 518 with the ratchet 191, shaft 187 is rotated by the driving mechanism of the machine. Rotation of shaft 187 will cause the rotation of shaft 370 in the direction indicated by the arrow in Fig. 20. Cam 510, during its rotation, causes leftward movement of a cam follower arm 520. The latter arm is provided with a roller 521 which closely follows the contour of the cam by reason of a linked chain connection 522 between the arm 520 and a sprocket 523 which is biased in a clockwise direction about a shaft 524 by a strong spring 525. As the sprocket 523 is secured to shaft 524, the shaft will be rotated in a counterclockwise direction as arm 520 is moved to the left by cam 510. The front end of shaft 524 is connected to arm 526 (Fig. 7) which is moved counterclockwise with the shaft 524. The upper end of arm 526 is provided with a stud 527 which rides in a slot 528 in an arm 529 pivoted to the right end of the carriage 505 on a shaft 530. A connecting spring 532 causes arm 529 to pull the carriage to the left as arm 526 rotates counterclockwise. The picker fingers 501 and 502 feed over the edge of the card and soon after the carriage has begun its movement, are permitted to close with a gripping action on the card by reason of the fact that arm 501 runs off the end of cam member 503. As the card moves forward, the leading edge passes through the slot 406 and into proper punching and printing alignment. At this time card pickers 501 and 502 are still holding the card firmly. Printing and punching operations are effected in a manner previously described. The timing of cam 510 is such that the carriage will remain idle during printing and punching operations and then will, upon continued rotation of cam 510, return to its limit of travel to its right. Since the card rack has remained stationary, the card is moved once again into its proper place in the rack. Near the end of the rightward travel of the carriage, the card picker fingers are again cammed open by cam member 503 so as to release the card and allow it to remain seated in its proper card pocket. When the roller 521 reaches the low spot of cam 510, carriage 505 moves a short distance further by its momentum tensioning spring 532 (Fig. 7) and being cushioned by a buffer 505a striking against a tie bar 508a between the guide rails 508 and 509. During this movement a plunger 533 operates against a pin 534 to open momentarily a pair of contacts 709 mounted on the upper guide rail 508. Opening of contacts 709, as will be explained later, causes the deenergization of a plurality of established circuits to help restore the machine to normal.

*Differential card alignment.*—As pointed out above, the first information recorded on a new card is the printing of the employee's name, number, the date, his morning in time, the punching of his department number, and the punching of his man number. During the remainder of the first day of the week and throughout the other days of the week, the only records made are the printing of the time and the punching of time credit punches under certain conditions. The shift of the recordings from line to line is accomplished by progressive daily movement of the type wheel carriage, in the manner previously described. The columnar shifting for successive recordings during a single day is controlled by mechanism associated with the carriage 505 which will now be described.

An abutment member 536 having six steps 537 representing morning in, noon out, noon in, night out, overtime in, and overtime out, is secured to a shaft 538 carried by the lower guide rail 509. Also secured to shaft 538 is a small gear 539 meshing with a rack member 540. Geared to rack 540 is a small pinion 541 integral with a gear 542, which in turn, connects with a rack member 543 slidably mounted directly above it on pins 544 secured to the lower guide rail 509. The rack member 543 carries a contact operating arm 545 which cooperates with a plurality of sets of carriage contacts, designated CC1 to 4 and CC6, mounted on the upper guide rail 508 for a purpose to be described later. Arm 545 is cammed forward by a cam member 535 as the carriage reaches its leftward limit of travel. When thus operated, arm 545 closes the particular CC contact assembly with which it is aligned.

The lower end of rack member 540 meshes with a sector gear 546 connected to a shaft 547. Shaft 547 is biased in a counterclockwise direction by a spring 549. This spring tends to move rack member 540 to the right, causing abutment member 536 to be rocked counterclockwise. The spring 524, however, is stronger than spring 549 and is effective to move the carriage into its extreme right position, in which position the spring 549 is stretched as a roller on arm 548 is engaged by the carriage. The abutment 536 is aligned with a stop 550 connected to the carriage, the latter stop being arranged to engage one of the abutment steps 537.

The factor which determines which one of the steps 537 is to be engaged by the stop 550 is dependent upon the extent to which spring 549 is permitted to move rack member 540 after the carrriage has moved away from arm 548. Mechanism for controlling this movement comprises a large card location selector assembly generally designated 560 (Fig. 11) containing a plurality of individual card locating units, one for each pocket of the card rack. As these units are all the same only one need be described. With the drum at rest in any of its operated positions, an arm 561 of one of the units stands in the path of movement of an arm 551 connected to shaft 547, so as to limit the leftward movement of arm 551, as viewed in Fig. 11.

One of the individual locating units is shown in detail in Fig. 19 and will be described with reference to that figure. The arm 561 is slidably carried by the large disk 243 and a smaller disk 253 attached to the same hub 231 has the disk 243 (see Fig. 11). The arm extends through holes 562 and 563 of disks 253 and 243 and is biased in a leftward direction by spring 564. The upper portion of arm 561 is provided with ratchet teeth 565 adapted to engage with a pawl member 566 pivotally carried by a slidable arm 567 which extends through openings 568 and 569 in disks 243 and 253, respectively, and slides along the upper surface of another slidable arm 570. A pair of pawls 571 and 572 are connected to arm 570 by springs 573 and 574 and pivoted about a pin 575. Pawl 572 is adapted to cooperate with the ratchet teeth 565 and pawl 571 engages in one or the other of two notches on extension 570a of slidable arm 570.

Operation of the unit just described is effected during the return movement of the carriage by a downwardly extending stud 576 (Fig. 20) on the carriage which engages with a pawl 577 pivoted at 578 on an arm 579. Arm 579 is loosely pivoted on a shaft 580 carried by a bracket 581 fastened to the base of the machine and is normally biased against pin 581a on the bracket 581 by a spring 584. Arm 577 is normally biased against a pin 582 on arm 579 by a spring 583. The arrangement is such that during forward movement of the carriage, the stud 576 engages arm 577 but merely rocks it on its shaft 578 and then passes by it. On the return stroke of the carriage, however, as the stud 576 engages arm 577, the latter arm is against its stop 582 and, therefore, causes the movement of the larger arm 579 to the right. An arm 585 is secured to shaft 580 and is connected to arm 579 by a spring 586. Accordingly, the rightward movement of arm 579 is accompanied by an upward movement of arm 585 which rocks shaft 580 in a clockwise direction, as viewed in Fig. 20. At the other end of shaft 580 (Fig. 17) is an operating arm 587 (see also Fig. 11) pinned to the shaft so as to move in toward one of the elements 567 with which it is aligned in accordance with the position of the card rack at the time.

Returning now to Fig. 19, it will be appreciated that a rightward movement is imparted to the arm 567 and hence to the pawl 566. The latter pawl being in engagement with the teeth 565 causes arm 561 also to be moved to the right. Movement of the arm 561 to the right causes the end of pawl 572 to be cammed upwardly and over into the next tooth, thereby holding the arm 561 in its operated position. The arrangement is such that the rightward movement of pawl 566 is limited by its contact with the front edge of pawl 572 so that the operation is limited to a single tooth movement. It will be noted that there are six teeth on the arm 561 which correspond with the six steps in the abutment member 536 of Fig. 20, and which are representative of the maximum number of time recording positions for one working day beginning with morning in and ending with overtime out.

*Circuit diagram and operation*

Referring now to Fig. 41, a double pole switch 700 connects the circuits of the machine with a suitable source of power supply. The circuits which control the various machine operations described hereinbefore will, in each instance, be traced from a common wire 701 to a common wire 702 connected to the positive and negative terminals of the line, respectively, when switch 700 is thrown to the closed position.

The insertion of a token and the depression of handle 54 by the employee causes the leading edge of the token rack 432 to close a pair of contacts 705 to energize a motor relay 706 by a circuit from wire 701, wire 703, relay magnet 706, wire 704, contacts 707, wire 708, contacts 705 now closed, to wire 702. Once energized, relay 706 holds itself through contacts 706a now closed, contacts 709, 710, 711, and 712a, and also picks up the motor 70 by closing contacts 706b to complete a circuit from wire 701, wire 715, motor 70, contacts 706b, wire 716, to wire 702.

Insertion of the token by the operator also closes contacts 725, and the card rack clutch relay 718 is then energized by a circuit from wire 701, wire 715, relay magnet 718, contacts 720a, contacts 722a, contacts 725 now closed, wire 724, contacts 709, 710, etc., to wire 702. Relay magnet 718 closes its contacts 718a to connect the card rack clutch solenoid 150 in parallel with magnet 718 and thereby to bring about energization of the solenoid which, as previously explained, causes the card drum to be driven by the drive mechanism of the machine. As the drum starts its rotation contacts 707 and 721 assume positions opposite from that shown. Contacts 707 open the initial circuit to the motor relay 706 and contacts 721 energize a relay magnet 753 to close its contacts 753a for a purpose to be described presently.

The solenoid 487 is energized at a time dependent upon the set up of the contact arms 477 on contact segments 476 of terminal board 480. It is this solenoid, it will be remembered, which controls the mechanism for stopping the drum within a zone of ten card pocket positions. The energization of solenoid 487 is effected in the following manner: First of all, a circuit is completed from wire 701, wire 715, relay magnet 730, wire 729, common strip 743, in the tens order, through the contact arm 477 now resting on the "2" position, through cable 744, the "2" segment on the emitter, common strip 745, wire 746, common strip 747 of hundreds order, contact slide 477 in that order, plug wire 748, wire 749, common strip 750 in the thousands order, through slidable contact 477 of that order to the zero segment, plug wire 751, wire 752, contact 725 now closed, wire 724, contact 709, contact 710, and so forth, to line 702. The plugging shown in Fig. 41 for the hundreds and thousands orders is to accommodate a capacity of more than 100 but less than 200 time cards which would be about the usual number required of a particular machine. It will be noted, that the thousands order is plugged in the zero position for a capacity of less than one thousand and that the hnudreds order is plugged in the zero position and also the one position for a number exceeding 100 but less than 200.

Energization of relay magnet 730 through the circuit described above, causes closure of contacts 730a to connect solenoid 487 in parallel with relay magnet 730, the parallel connection being through wire 728, contact 730a, and contact 732a. At the same time, a circuit is completed through relay magnets 732 and 733 as follows: Wire 701, wire 715, wire 727, relay magnet 732, relay magnet 733, contact 732a, wire 729, common strip 743, and so forth, back to line 702.

Energization of magnet 733 closes contacts 733a to complete a circuit to energize solenoids 156 and 157 from wires 701, 715, and 731, through contacts 753a now closed, contacts 733a, solenoids 156, 157, wire 752, contacts 725, now closed, wire 724, and so forth, back to line 702.

The card rack is thus disconnected from the drive mechanism and halted in the proper zone by the mechanism controlled by the energized solenoid 487. Now, as the card rack moves away from its zone stop postion under the bias of return spring 263, contact fingers 428, 429 move along the segments 601 and the common strip 602 to connect these segments successively with the strip. A governor 645 (Fig. 18) controls the speed of movement by its engagement with circular rack 495. In the example chosen, the units position is standing at "9" or, in other words, contact arm 477 in the units position is at rest in the "9" position. Accordingly, as contact fingers 428, 429 move into the "9" position, a circuit is completed through unit latch solenoid 624 as follows: Wire 701, wire 715, relay magnet 732, wire 734 and wire 735, solenoid 624, to the uppermost segment 476, through contact arm 477 in "9" position, cable 438, through segment 601 in the "9" position, contact fingers 428, 429, common strip 602, wire 729, contact strip 743, in the tens order, contact arm 477 in the "2" position, cable 744, through the "2" emitter segment, common strip 745, wire 746, contact arm 477, into the zero position, plug wire 748, wire 749, common strip 750, contact arm 477 in the zero position, plug wire 751, wire 752, contacts 725, wire 724, and so forth, back to wire 702.

Energization of solenoid 624 operates latch arm 631 as described hereinbefore, to cooperate with a tooth of ratchet 241 to thereby select a unit position of the rack from the zone selected by solenoid 487. The arrangement is such that solenoid 624 is operative for odd number positions and solenoid 625 is operative in a similar manner for even number positions. Closure of contacts 733a also completes a circuit through the brake magnet 490 and the brake relay coil 640, the circuits being in parallel with the solenoids 156 and 157. The effect is to give a brief impulse to the drum brake magnet 490 so as to tend to check the rebound tendency of the drum, the magnet 490 being deenergized almost immediately by the opening of contacts 640a controlled by the relatively slow acting relay magnet 640.

In the event that the card drum is driven to its limit of travel to its right, rather than being stopped at any intermediate position, contacts 760 are closed by contact of the edge of the sector gear plate 142 with the lower end of an arm 757 (Fig. 12) fastened to a shaft 758 to which is also fastened a contact operating arm 759. The arm 757 is normally biased by a spring 749 against a fixed stop 749a. A stud 759a with an insulated tip actually operates the contacts 760 to energize a drum release relay 712, by a circuit from wire 701, relay magnet 712, contacts 760 now closed, wires 761 and 762, contacts 705 now closed, to wire 702. The closure of contacts 760 is momentary, so that the relay 712 is energized but a brief instant. Relay 712 when energized causes contact 712a to break the motor relay circuit. Contacts 712b close a parallel circuit around cam contacts 758a to energize the token release solenoid 445. The circuit just described is effective when the operating handle 54 is depressed with no token inserted in the machine. A similar circuit is completed through contacts 227 rather than contacts 705 for releasing the card rack at the end of card feeding operations which will be explained later.

With the card rack stopped in the selected unit position, the next step is to initiate card feeding operations and to do this, it is necessary to energize the clutch solenoid 512 to trip its associated clutch. Upon the energization of relay magnet 733, explained above, contacts 733b also close to complete a circuit through relay magnet 755, from wire 701, wire 754, contacts 733b, relay magnet 755, contacts 709, 710, and so forth, to wire 702. Contacts 755a close upon energization of relay magnet 755 to complete the required circuit through clutch solenoid 512, the circuit being from wire 701, wire 756, contact 755a, clutch solenoid 512, contacts 709, 710, and so forth, to wire 702.

Energization of clutch solenoid 512 causes rotation of shaft 187 by the motor drive mechanism to rotate a pair of cams 757 and 758 which cooperate with contacts 757a and 758a, respectively. On the first recording of the day, contacts CC1a and CC1b will be operated by the carriage 505 as it moves the card all the way into the left. If it is the first day of the week, contacts 344 will also be held closed by slide 343 at the top of the type wheel carriage. Closure of contacts 757a, CC1a, and contacts 344 completes a circuit through the solenoid 420, which renders the punching unit effective to punch the man number and the department number in the card. Solenoid 358 is energized at the same time to cause printing of the employee's name and number in addition to the customary time printing on the card. The circuit is completed when cam contacts 757a close, from wire 701, contacts 344, solenoids 420 and 358 in parallel, contacts CC1a, contacts 757a, wire 759, contacts 709, 710, and so forth, to wire 702. The effect of the closure of contacts CC1b will be explained later.

The card picker carriage 505 returns the card into its original position in the drum, and in moving back causes arm 587 to operate against the slidable arm 567 to move the latter arm one notch outwardly. As the picker carriage reaches the right end of its travel, the card right contacts 709 break the established circuits and stop the motor. The cam 650 (Fig. 15) operates a follower arm 651 which joins with knock-off arms 652 and 653 connected by a link 654 to withdraw the engaged one of the latch arms 631 or 632 from the ratchet teeth. The drum will then return to its home position under the influence of spring 263 where it is halted by the engagement of a stop 660 on the disk 243 with a bent over portion of a pawl 661 pivoted at 603. to a dog 662 and held in normal position against a pin 665 on the dog by a connecting spring 664. The dog 662 is effective to engage the ratchet teeth when rocked upwardly by the engagement of pawl 661 with stop 660. In other positions of the card rack, a spring 666 holds the dog clear of the ratchet teeth. As the drum arrives at the home position, the front position of sector gear plate 142 operates a contact assembly including contacts 707 and 721, to move these contacts once again to the position shown. Contacts 721 thereby opening the circuit to the relay magnet 753 which, in turn, opens its contacts 753a to break an established circuit through the solenoids 156, 157 and relay magnet 733. The closure of contacts 707 prepares for a new cycle of operation of the machine upon the next insertion of the token.

The last step in the operating cycle of the machine is the energization of the token release solenoid 445. This energization is accomplished by a circuit from line 701, wire 715, wire 719, cam contacts 758a which are closed at this time, solenoid 445, to wire 702. Energization of a solenoid 445 by the circuit just described releases the token and permits the token rack 432 to move to the front to cause the key to project through the opening 56 in the front of the cover 50 so that it may be easily withdrawn by the employee. The circuit which energized solenoid 445 is made only for a brief period of time since contacts 758a open again before shaft 187 latches up.

On each subsequent operation of the machine at noon out, noon in, night out, overtime in, overtime out, the time is printed, but the printing of the name and number of the employee and the punching of his number and of the number of the department are withheld because, as can be seen from the circuit diagram, the solenoids 358 and 420 controlling these operations fail to energize on account of the open condition of the contacts CC1a, the card feed carriage 505 having left the extreme left position where it closes these contacts.

On each operation of the machine from morning in to night out, the regulartity of the employee is tested by a control mechanism now to be described. If the time of any operation of the machine is irregular, this control means operates to prevent the actuation of the full day credit punch at the end of the day, or the half day credit punch if the machine has been set for a half day record. The regularity control means comprises an emitter 322 connected through an arm 321, common connection 323, wire 701, to the positive line terminal. The arm 321 is moved progressively by the time controlled program mechanism previously described. The emitter consists of three conductive segments and three insulated portions. The conductive segment 322a pertains to the morning in operation, segment 322b to the noon out and noon in operations, and segments 322c to the night out operation. The overtime operations are not affected by the emitter. If the arm 321 is at the proper conductive segment at the time of each operation of the machine, a solenoid 620 will be energized to govern certain control mechanisms to be described later. If the solenoid is not energized at any one of the operations of the machine, the control mechanism will be adjusted to, and remain in, a condition which will prevent the operation of the full day credit punch at the end of the day.

The circuit through the emitter 322 for the morning in time is from wire 701, common strip 323, arm 321, conductive segment 322a, wire 762, contacts CC1b, closed when the card is fed into the printing position, wire 763, wire 764, solenoid 620, contacts 757a, closed during the printing operation, wire 759, contacts 709, contacts 710, etc., to wire 702. If the arm 321 has left segment 322a before this operation of the machine, the solenoid 620 will not be energized and the control mechanism will accordingly be set to prevent operation of the full day credit punch at the end of the day.

The noon out and noon in records must be made while the arm 321 is at segment 322b, to prevent a showing of irregularity. On the noon out operation, the circuit is from wire 701, common strip 323, arm 321, emitter segment 322b, contacts CC2b, wire 764, solenoid 620, etc., to wire 702. If the switch 765 is in the position shown in the circuit diagram, a circuit is also established through contacts CC2a, wire 767, wire 768, contacts 605, solenoid 412, contacts 705 (closed at this time) to wire 702. The latter circuit is used for the half day credit punching and the switch 765 must be thrown manually to the position shown for half working days. The solenoid 412, it will be remembered, controls the operation of the time credit punch 400a. If it is energized on the noon out recording, a punch will appear in the half day credit column.

At the noon in recording, if the contact 321 is still on segment 322b, a circuit is established from the segment 322b through wire 766, switch CC3, and wires 763, 764 to solenoid 620, thence to the wire 702 as before.

At the night out recording, if the arm 321 has reached the emitter segment 322c, a circuit is established from that segment through wire 769, contacts CC4b, wire 764, solenoid 620, thence to the wire 702 as before. A circuit is also established from wire 769, through contacts CC4a, wire 768, contacts 605, solenoid 412, wire 762, and contacts 705 to the wire 702. Thus, the solenoid 412 is energized to cause an operation of the time credit punch 400a in the full day credit column provided all the recordings during the day have been made within the regular time schedule.

If the employee wishes to start on overtime when he records his night out time, he leaves his token in the machine and operates the handle 54 a second time. This causes the time to be printed again, in the overtime in column. There is no carriage contact of the group CC1—4 and CC6 for the position of the carriage 505 on recording the overtime in time (see Fig. 20). On the overtime out recording, the CC6 contacts are closed to establish a circuit from wire 701, through wire 715, contacts CC6, contacts 605, solenoid 412 and contacts 705 to the wire 702. Thus, the time credit punch 400a is operated again, this time in the overtime credit column.

The mechanism controlled by the solenoid 620 to determine whether the time credit punch is to be operated in conjunction with the night out recording will now be described. Energization of solenoid 620 causes the slight forward movement of rack 695 (to the right in Fig. 37) which is mounted for sliding movement on the upper bar of the type-wheel carriage frame and which is provided with a return spring 697. The rack has seven teeth corresponding to the days of the week and cooperates with a detent arm 698 pivoted on shaft 699 carried by the side frame. Arm 698 is provided with a pin 681 engaging the end of arm 682 fixed to a rock shaft 683 which extends across the back of the machine (Fig. 9) and is operated from a cam 612 on shaft 187. The cam follower arm 613 engages the cam 612 and is fastened to an arm 615 (Fig. 38) which is spring connected to an arm 616 fixed to shaft 683.

It will be noted that energization of solenoid 620 is effective to move the rack so that the end of arm 698 engages on top of a tooth of rack 695. Movement of shaft 683 and of the arms positively connected thereto is thereby prevented. If the solenoid 620 fails to energize, then full movement of shaft 683 occurs as arm 698 seats in a notch in rack 695. The shaft 683 is fixed to an arm 617 (Fig. 38), the outer end of which is connected by a link 618 to an operating arm 619 (Fig. 39) fixed to a rock shaft 611. To the shaft 611 is also fixed a downwardly extending arm 610, the lower end of which engages in a notch 570b in the slide bar 570 of that one of the locating units which pertains to the pocket of the card drum in operative position. The movement imparted to arm 613 by cam 612 is transmitted to the arm 610 to cause a movement of the latter toward the left in Fig. 39. If the solenoid 620 has been energized and the arm 698 thereby prevented from rocking, the movement of the cam follower arm 613 will be taken up by the spring connecting arms 615 and 616 and the arm 610 will not be moved to the left. If the slide bar 570 is moved to the left at any time during the day, the pawl 571 (Fig. 19) drops into the right hand notch of the arm 570a and holds the slide bar 570 in its displaced position, with the effect to be described presently.

Another cam 630, pinned to shaft 187, operates against roller 631 on a follower arm 632 which is connected with a lever 633 pivoted at 634. Upward movement of arm 632 effected by rotation of cam 630 causes downward movement of the contact assembly comprising contacts 605 which is connected to the pivoted lever 633. The arrangement is such that, if the arm 570 of the reselected position has been moved to the left by the operating arm 610 (Fig. 39), it will engage the contacts 605 to open them, but if arm 570 is in its normal position, the contacts will move freely past the end of the arm. Thus, it will be noted that if all the registering during the day has been made at the proper time, the magnet 620 will be energized each time to prevent operative movement of arm 570 and hence to prevent contacts 605 from opening when they are moved as previously described. Whenever contacts 605 open, the credit punching solenoid 412 fails to energize and consequently no credit punching occurs. As the circuit to solenoid 412 through overtime credit contacts CC6 does not pass through contacts 605, the overtime credit punch is independent of regularity during the day.

*Resetting of locating units.*—At the end of the prescribed overtime period for each day, contacts 327 are closed by cam 325 on shaft 315 to complete a circuit through the clutch magnet 680 (Fig. 6). Energization of magnet 680 causes operation of an arm 684 attached to the armature thereof. The arm 684 is pinned to a shaft 687 (Figs. 15 and 16) which is fastened to a latch assembly 693 adapted to latch a dog 694 and pawl 694a. Movement of arm 684 causes release of pawl 694a and dog 694 to cause shaft 194 to be operated by the drive mechanism. The drive is through gears 185, 186, 188, and 190 to ratchet as described hereinbefore and now through the pawl 694a and dog 694 to shaft 194.

A cam 641 pinned to the end of shaft 194 is thus rotated and causes operation of a follower arm 642. Arm 642 is pivoted to a shaft 643 and has a downwardly extending portion 644 which engages a large operating lever 646 which, in turn, is pivoted to a stud 647 on the base of the machine. One end of arm 646 carries a pin 648 engaging with one end of a bell crank lever 649 pivoted to a stud 649a fastened to the base of the machine. Connected to the other end of the bell crank is the lower end of arm 180 which, it will be remembered, is operated to bring rollers 176 against the sides of pawls 571 and 572 to reset the individual locating units to their normal morning in position for the next day. Also connected to bell crank 649 is a contact operating arm 690 which is effective to open contacts 710 for a brief moment. Actually, during resetting operations, the initial movement of arm 690 carries the arm past the contacts and it is on the return stroke that the contacts are briefly opened. The other end of the large arm 646 extends under the type wheel carriage unit (Fig. 27) and engages the lower end of the carriage operating arm 336 (Fig. 25). The cam 641 effects clockwise movement of the large arm 646 about pivot 647, as viewed in Fig. 16. Opposing this movement are the return springs 646a and 646b (Fig. 27).

Arm 336 is operated to normally move the carriage one position to the right, as viewed in Fig. 25, each time arm 646 is operated during resetting operations. The carriage movement is effected through pawl 335 and is controlled by the position of cam 338, which position is time controlled in conjunction with the program wheel.

Energization of the magnet 680, described above, causes but one cycle of operation because of the opening of normally closed contacts 710 which break the motor relay circuit. The latter circuit is prevented from being reestablished due to the fact that contacts 327 were closed only momentarily and are now opened.

On the second day of the week, the only printed recording on the card is the time, the operation of the printing platen for the employee's name and number and the date being prevented by the open condition of the contacts 344 (see Figs. 5 and 41), which keeps the solenoid 358 deenergized. The punching of the man number and department number is prevented in the same way by the deenergized condition of solenoid 420. The testing of the regularity of time recordings continues as on the first day, and the punching of the full day credit and overtime credit is controlled in the same way. The recordings on Wednesday through Friday follow the same pattern as the Tuesday recordings. On Saturday, the machine may be set for a half day, credit for a half day being punched in the manner previously described, if the time of recordings has been regular. The time card shown in Fig. 4 illustrates a number of different possible daily records to show when credit punching is to be effected and when such a perforation is to be omitted.

When the motor is to be started merely for feeding cards from the hopper into the drum, the lever 215 is operated to close contacts 227 and thereby energize the motor relay 706 from line 701, wire 703, motor relay 706, wire 704, contacts 707, wire 708, wire 762, contacts 227 now closed, to wire 702. Contacts 227 are closed at the end of the week automatically by an upward extending pawl 675 on the carriage which operates the card feed clutch lever 215. The card drum is fed to the limit of its travel and, at the same time, contacts 226 are opened to prevent the energization of clutch magnet 680. Card feeding operations continue until the extension 258 (Fig. 13) of clutch latching arm 256 drops into a slot 260 in the disk. This causes a considerable movement to be imparted to the arm 245 to cause pawl 248 to be raised and contact operating arm 677 to open contacts 711 for a brief moment. The opening of contacts 711 breaks the circuit to motor relay and hence stops the machine.

Only those features involving printing, or printing and punching mechanism, are claimed herein. Claims pertaining to time recording features will be found in the copending divisional application, Serial No. 401,539, filed July 8, 1941. Claims to the card storing and replenishing mechanism appear in the copending divisional application, Serial No. 401,540, filed July 8, 1941. Claims to the punching means will be found in the copending divisional application, Serial No. 401,541, filed July 8, 1941. Claims to the means for selectively positioning the card rack appear in the copending divisional application, Serial No. 431,553, filed February 19, 1942.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a recording machine, time recording means for making time recordings on a record, feeding means for feeding the record to recording position, an auxiliary recording means effective upon the initial feeding of the record to recording position for recording predetermined information on the record, and means controlled by the record feeding means for rendering the auxiliary recording means ineffective during subsequent feedings of the card to recording position.

2. In a time recorder, time printing means for effecting time printings on a record card, card feeding means for feeding the card to printing position, an auxiliary printing means effective upon the initial feeding of the card to printing position for printing predetermined information on the card, and means controlled by the card feeding means for rendering the auxiliary printing means ineffective during subsequent feedings of the card to printing position to receive further time printings.

3. In a time recorder, time printing means for printing time records on a record sheet, means for feeding the record sheet to printing position, key controlled perforating means effective upon the first feeding of the record sheet to printing position for perforating said sheet with predetermined information in accordance with the key, and means controlled by the sheet feeding means for rendering the key controlled punching means ineffective during subsequent feedings of the record sheet to printing position to receive further time records.

4. In a time recorder, time printing means for effecting time recordings on a record card, means for feeding the record card to printing position, an auxiliary recording means including key controlled printing and punching means effective upon the first feeding of the card to printing position for concurrently printing and punching predetermined information on the card in accordance with the key, and means controlled by the card feeding means for rendering the key controlled printing and punching means ineffective during subsequent feedings of the card to printing position to receive further time recordings.

5. In a time recorder, time recording means for printing time recordings on record cards, a rotatable drum having a plurality of pockets therein, each containing a record card, a drive motor, drive connections between the motor and the drum, key controlled means effective upon insertion of a key in an operating position to energize the motor and to concurrently complete the drive connections between the motor and the drum to rotate said drum to one of a plurality of predetermined positions in accordance with the key, means for disconnecting the drive connections between the motor and the drum at the selected position, card feeding means for feeding one of the record cards from the positioned drum to the time recording means to receive a time recording thereon, means controlled by the card feeding means on its return stroke to replace the card in its original pocket in the card drum, and means also controlled by the card feeding means at the end of the return stroke for causing the drum to be returned to its normal position.

6. In a time recorder, time recording means for printing the recordings on record cards, a movable card rack having a plurality of pockets therein, each containing a record card, a drive motor, drive connections between the motor and the rack, key controlled means effective upon insertion of a key in an operating position to energize the motor and to concurrently complete the drive connections between the motor and the rack to drive the rack to one of a plurality of predetermined positions in accordance with the key, means for disconnecting the drive connections between the motor and the rack at the selected position, card feeding means for feeding one of the record cards from the rack to the time recording means to receive a time recording thereon, means controlled by the card feeding means on its return stroke to replace the card in its original pocket in the card rack, means also controlled by the card feeding means at the end of the return stroke for causing the card rack to be returned to its normal position, and means also effective by the return stroke of the card feeding means to release the key from its operation position to thereby stop the motor.

7. In a workman's time recorder, time printing means for printing time recordings on a record card, a control key for each workman having type elements designating the man's name and number, a card file carrying a plurality of record cards, one for each workman, in predetermined location therein, means effective upon insertion of a key in operating position for selecting a card from the card file and printing the workman's name and number concurrently with a time printing made thereon by the time printing means, a plurality of punching elements also set up by the key to perforate the card to represent the workman's number, means effective following printing and punching operations for returning the card to its proper location in the file, and means operative upon a second insertion of the key by same workman to select the same card from the rack but this time to render only the time printing means effective.

8. In a workman's time recorder, time printing means for printing time recordings on a record card, a control key for each workman having type elements designating the man's name and number, a card file carrying a plurality of record cards, one for each workman, in predetermined location therein, means effective upon insertion of a key in operating position for selecting a card from the card file and printing the workman's name and number concurrently with the operation of the time printing means, a plurality of punching elements also set up by the key to perforate the card to represent the workman's number, other punching elements and settable means causing the latter elements to perforate the card to represent the department number, means effective following printing and punching operations for returning the card to its proper location in the file, and means operative upon a second insertion of the key by same workman to select the same card from the rack but this time to render only the time printing means effective 9. In a machine of the class described, a rotatable drum having a plurality of card receiving pockets therein, biasing means for normally holding the drum in a home position, a drive motor, key controlled means for energizing the motor to rotate the drum away from the home position, a plurality of slidable contacts differentially positioned in accordance with the key, a circuit controlling device for controlling the circuits through said contacts, means connected to the drum for stepping the circuit controlling devices to successive positions during the rotation of said drum, means rendered operative by the circuit controlling device in one of its positions for stopping the drum within a predetermined zone, the biasing means then becoming effective to move the drum in the opposite direction toward the home position, means associated with the circuit controlled during the return movement of the drum for stopping the drum in a single position within the selected zone, recording mechanism, means to feed a predetermined one of the cards, in accordance with the selected stop positions of the drum, to a recording position to cause said card to receive a recording from the recording mechanism, and means to withdraw said card from recording position after recording operation and replace it in its proper place in the card drum, the biasing means then being rendered effective to return the drum completely to the home position.

10. In a machine of the class described, a movable card rack having a plurality of card receiving pockets therein, biasing means for normally holding the rack in a home position, a drive motor, key controlled means for energizing the motor to rotate the rack away from the home position, a plurality of movable contacts differentially positioned in accordance with the key, a circuit controlling emitter for controlling the circuits through said contacts, means connected to the rack for stepping the emitter to successive positions during the rotation of said rack responsive to the circuit controlled in one of its positions for stopping the rack within a predetermined zone, the biasing means then becoming effective to move the aforesaid rack in the opposite direction toward the home position, means associated with the circuit controlled during the return movement of the drum for stopping the rack in a single position within the selected zone, recording mechanism, means to feed a predetermined one of the cards, in accordance with the selected stop position of the rack, to a recording position to cause said card to receive a recording from the recording mechanism, and means to withdraw said card from recording position after recording operation and replace it in its proper place in the card rack, the biasing means then being rendered effective to return the rack completely to the home position.

11. In a machine of the class described, a record file having a plurality of compartments therein, means for conditioning said file for selection of a record from one of said compartments, recording means for recording on said record, record feeding means having means to pick the selected record from said file and movable to transfer said record from the file to said recording means and back to the file, and means to operate said recording means when the record is presented thereto by said record feeding means.

12. In a machine of the class described, a record file having a plurality of compartments therein, means for conditioning said file for selection of a record from one of said compartments, recording means for recording on said record, record feeding having means to grasp the selected record and movable to transfer said record from the file to said recording means and back to the file, means to render said grasping means effective at the start of said transfer movement from the file and to release said grasping means upon the return of the record to the file, and means to operate said recording means when the record is presented thereto by said record feeding means.

13. In a machine of the class described, recording means, a file having a plurality of compartments therein to hold individual records, means for selectively positioning said file to present a particular record in position for transfer to said recording means, record feeding means having to and fro movement between said file and said recording means and having means to grasp a record presented in transfer position for movement to said recording means and back to said file, and means to operate said recording means when the record is presented thereto by said record feeding means.

LAURENCE S. HARRISON.